US009789915B2

United States Patent
Grandominico et al.

(10) Patent No.: US 9,789,915 B2
(45) Date of Patent: Oct. 17, 2017

(54) DEVICE FOR REDUCING VEHICLE AERODYNAMIC RESISTANCE

(71) Applicants: Gary Grandominico, Galena, OH (US); Dominic Grandominico, Columbus, OH (US); Raymond McDonald, Pooler, GA (US); Sean Graham, Issaquah, WA (US); Bret Moss, Lewis Center, OH (US); Stuart Dailey, New Albany, OH (US); Christopher J. Gelin, Chagrin Falls, OH (US)

(72) Inventors: Gary Grandominico, Galena, OH (US); Dominic Grandominico, Columbus, OH (US); Raymond McDonald, Pooler, GA (US); Sean Graham, Issaquah, WA (US); Bret Moss, Lewis Center, OH (US); Stuart Dailey, New Albany, OH (US); Christopher J. Gelin, Chagrin Falls, OH (US)

(73) Assignee: Ridge Corporation, Pataskala, OH (US)

( * ) Notice: Subject to any disclaimer, the term of this patent is extended or adjusted under 35 U.S.C. 154(b) by 0 days.

(21) Appl. No.: 15/077,404

(22) Filed: Mar. 22, 2016

(65) Prior Publication Data
US 2016/0200377 A1 Jul. 14, 2016

Related U.S. Application Data

(63) Continuation of application No. 14/448,248, filed on Jul. 31, 2014, now abandoned.
(Continued)

(51) Int. Cl.
*B62D 35/00* (2006.01)

(52) U.S. Cl.
CPC ......... *B62D 35/001* (2013.01); *B62D 35/007* (2013.01)

(58) Field of Classification Search
CPC .. B62D 35/001; B62D 35/002; B62D 35/007; B62D 37/02; B62D 63/08
(Continued)

(56) References Cited

U.S. PATENT DOCUMENTS

| 3,951,445 A | 4/1976 | Tatom |
| 3,960,402 A | 6/1976 | Keck |

(Continued)

FOREIGN PATENT DOCUMENTS

| CA | 2166495 | 7/1997 |
| CA | 2171398 | 9/1997 |

(Continued)

OTHER PUBLICATIONS

International Search Report and Written Opinion, Mailed Apr. 6, 2015.
(Continued)

*Primary Examiner* — Jason S Daniels
(74) *Attorney, Agent, or Firm* — Walter | Haverfield, LLP; James J. Pingor

(57) ABSTRACT

An aerodynamic resistance reduction system for a vehicle is provided and includes a pair of vertical panels pivotally attached to a rear end adjacent to rear vertical edges of a vehicle, a first horizontal panel assembly pivotally attached to a top end to each of the pair of vertical panels and pivotally attached to the rear end adjacent to a top horizontal edge of the vehicle, and a second horizontal panel assembly pivotally attached adjacent to an inside surface of each of the pair of side panels, the second horizontal panel assembly being disposed between the first horizontal panel assembly and a lower edge of the rear end of the vehicle.

19 Claims, 24 Drawing Sheets

Related U.S. Application Data

(60) Provisional application No. 61/860,692, filed on Jul. 31, 2013.

(58) Field of Classification Search
USPC .................... 296/180.2, 180.3, 180.4, 180.5
See application file for complete search history.

(56) References Cited

U.S. PATENT DOCUMENTS

| | | | |
|---|---|---|---|
| 4,300,797 A | 11/1981 | Whitley et al. | |
| 5,498,059 A * | 3/1996 | Switlik ................ | B62D 35/001 296/180.1 |
| 5,902,000 A | 5/1999 | Wold | |
| 6,428,084 B1 | 8/2002 | Liss | |
| 6,485,087 B1 | 11/2002 | Roberge et al. | |
| 6,742,616 B2 | 6/2004 | Leban | |
| 7,431,381 B2 | 10/2008 | Wood | |
| 7,712,821 B2 | 5/2010 | Moscoso | |
| 7,748,772 B2 | 7/2010 | Boivin et al. | |
| 7,794,011 B2 | 9/2010 | Kjellgren et al. | |
| 7,854,468 B2 | 12/2010 | Vogel et al. | |
| 7,887,120 B2 | 2/2011 | Boivin et al. | |
| 7,938,475 B2 | 5/2011 | Boivin et al. | |
| 7,942,467 B2 | 5/2011 | Boivin et al. | |
| 7,942,468 B2 | 5/2011 | Boivin et al. | |
| 7,942,469 B2 | 5/2011 | Boivin et al. | |
| 7,942,470 B2 | 5/2011 | Boivin et al. | |
| 7,942,471 B2 | 5/2011 | Boivin et al. | |
| D649,090 S | 11/2011 | Boivin et al. | |
| 8,177,287 B2 | 5/2012 | Vogel et al. | |
| 8,292,351 B2 | 10/2012 | Boivin et al. | |
| 8,449,017 B2 | 5/2013 | Boivin et al. | |
| 8,590,961 B2 | 11/2013 | Breidenbach | |
| 8,622,461 B2 | 1/2014 | Breidenbach | |
| 8,678,474 B1 | 3/2014 | Boivin et al. | |
| 8,708,398 B2 | 4/2014 | Breidenbach | |
| 8,708,399 B2 | 4/2014 | Smith et al. | |
| 8,845,007 B2 | 9/2014 | Ryan et al. | |
| 8,876,191 B2 | 11/2014 | Breidenbach | |
| 9,039,069 B2 | 5/2015 | Smith et al. | |
| 9,126,638 B2 | 9/2015 | Breidenbach | |
| 9,145,177 B2 | 9/2015 | Smith et al. | |
| 9,180,919 B2 | 11/2015 | Breidenbach | |
| 9,333,993 B2 * | 5/2016 | Telnack ................ | B62D 35/007 |
| 9,505,449 B2 * | 11/2016 | Telnack ................ | B62D 35/001 |
| 2003/0227194 A1 | 12/2003 | Farlow et al. | |
| 2004/0119319 A1 | 6/2004 | Reiman et al. | |
| 2004/0261335 A1 * | 12/2004 | Eungard .............. | B65G 69/008 52/173.2 |
| 2009/0200834 A1 | 8/2009 | Vogel et al. | |
| 2011/0084516 A1 * | 4/2011 | Smith .................. | B62D 35/001 296/180.4 |
| 2014/0217775 A1 | 8/2014 | Breidenbach | |
| 2014/0319870 A1 | 10/2014 | Breidenbach | |
| 2014/0346807 A1 | 11/2014 | Breidenbach | |
| 2015/0266520 A1 | 9/2015 | Breidenbach | |

FOREIGN PATENT DOCUMENTS

| | | |
|---|---|---|
| CA | 2221593 | 7/1999 |
| CA | 2311204 | 1/2001 |
| CA | 2281064 | 2/2001 |
| CA | 2315339 | 2/2001 |
| CA | 2316584 | 2/2001 |
| CA | 2450243 | 12/2002 |
| CA | 2361224 | 5/2003 |
| CA | 2510464 | 7/2004 |
| DE | 2911084 | 9/1980 |
| DE | 2922130 | 12/1980 |
| DE | 3817497 | 12/1988 |
| DE | 19524825 | 1/1997 |
| DE | 19640965 | 4/1997 |
| DE | 29705882 | 5/1997 |
| DE | 29623407 | 6/1998 |
| DE | 10228658 | 1/2004 |
| DE | 10240504 | 3/2004 |
| DE | 10316105 | 10/2004 |
| EP | 1870321 | 12/2007 |
| FR | 2623155 | 5/1989 |
| GB | 2207398 | 2/1989 |
| JP | 06016157 | 1/1994 |
| WO | 2007005344 | 1/2007 |
| WO | 2007079306 | 7/2007 |
| WO | 2008024386 | 2/2008 |
| WO | 2013188669 | 12/2013 |
| WO | 2014011886 | 1/2014 |

OTHER PUBLICATIONS

Kambiz Salari, et al., "Heavy Vehicle Drag Reduction Devices: Computational Evaluation & Design," DOE Heavy Vehicle Systems Review, Apr. 18-20, 2006; 24 Pages.

U.S Department of Energy, Freedom Car and Vehicle Technologies Program, "Heavy Vehicle Systems Optimization," 2004 Annual Progress Report; 206 Pages.

Randall L. Peterson, "Drag Reduction Obtained by the Addition of a Boattail to a Box Shaped Vehicle," NASA Contractor Report 163113, Aug. 1981; 32 Pages.

Rose McCallen, et al, "Progress in Reducing Aerodynamic Drag for Higher Efficiency of Heavy Duty Trucks (Class 7-8)," Lawrence Livermore National Laboratory, Apr. 1999, 14 Pages.

J M Ortega and K. Salari, "An Experimental Study of Drag Reduction Devices for a Trailer Underbody and Base," Lawrence Livermore National Laboratory, Jun. 4, 2004; 17 Pages.

Randal Scott Funderburk, B.S.M.E., "An Investigation of a Drag Reducing Device for Tractor-Trailers," A Thesis in Mechanical Engineering, May 1996; 128 Pages.

Rose McCallen, et al,"The Aerodynamics of Heavy Vehicles: Trucks, Buses, and Trains," Springer, Lecture Notes in Applied and Computational Mechanics, vol. 19; 534 Pages.

Ken Visser, "Drag Reduction of Tractor Trailers," Clarkson University, Potsdam, New York, Nov. 2005; 4 Pages.

Michael J. Ogburn, Laurie A. Ramroth, "Truck Efficiency and GHG Reduction Opportunities in the Canadian Truck Fleet," Rocky Mountain Institute, CO; 13 Pages.

Timothy Deschenes and Dr. Kenneth Visser, Mechanical and Aeronautical Engineering, Mechanical and Aeronautical Engineering, Clarkson University; 2 Pages.

Non-Final Office Action for U.S. Appl. No. 14/448,248 dated May 4, 2015, 14 Pages.

Final Office Action for U.S. Appl. No. 14/448,248 dated Sep. 22, 2015, 17 Pages.

* cited by examiner

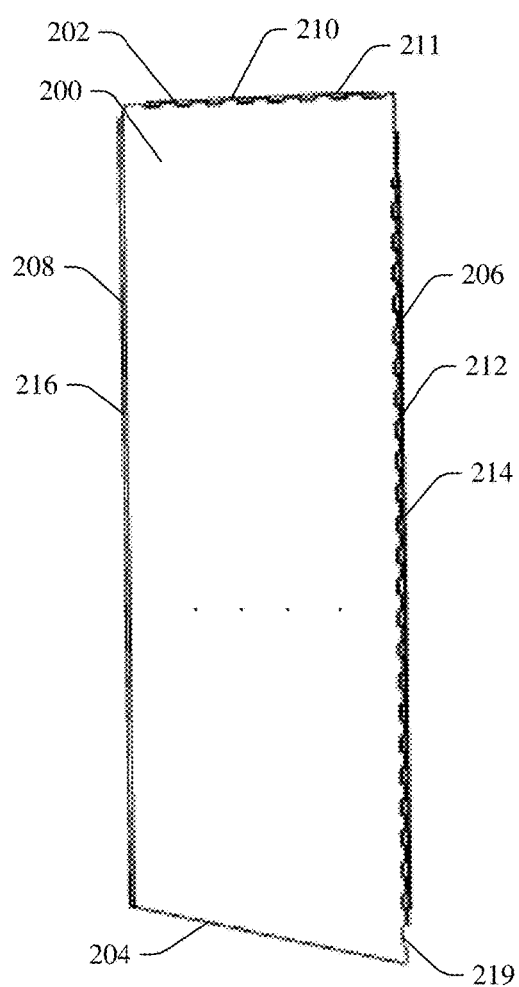
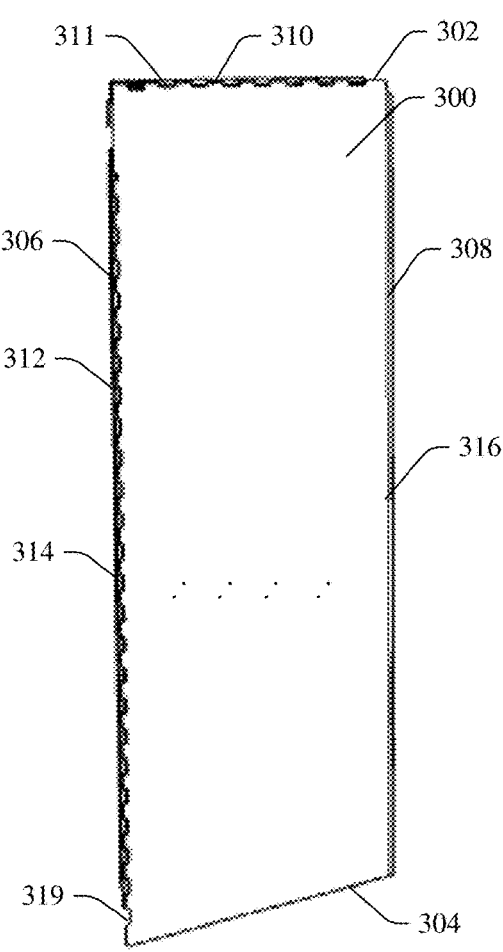
FIG. 8
FIG. 9

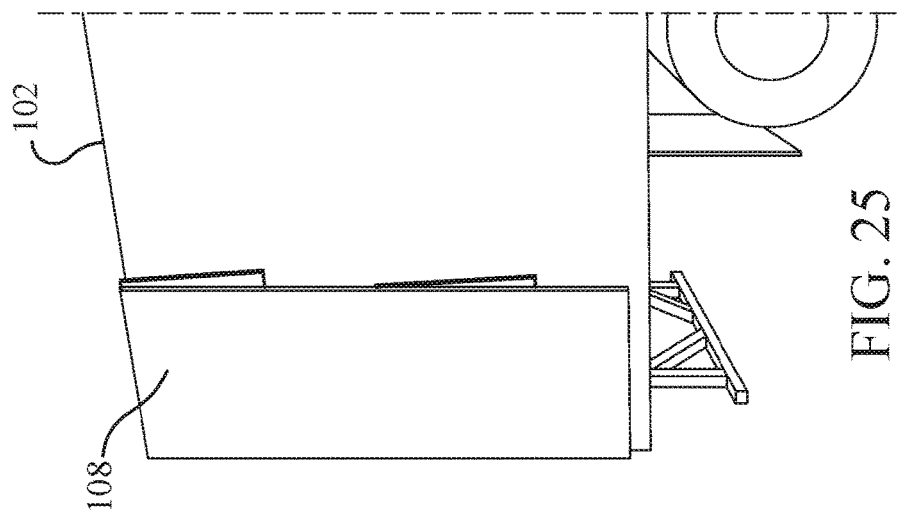
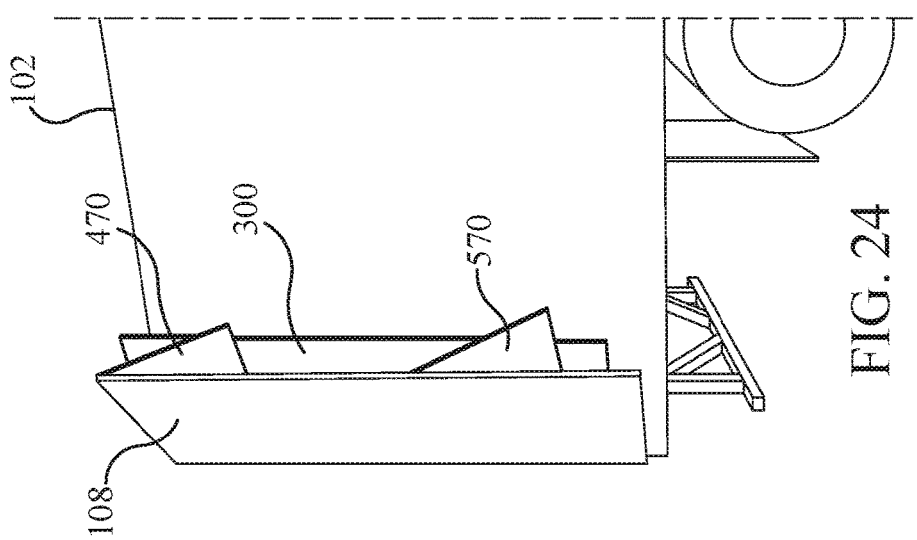

DEVICE FOR REDUCING VEHICLE AERODYNAMIC RESISTANCE

CROSS-REFERENCE TO RELATED APPLICATIONS

This application is a continuation of, and claims the priority of, U.S. patent application Ser. No. 14/448,248, filed Jul. 31, 2014, and entitled "DEVICE FOR REDUCING VEHICLE AERODYNAMIC RESISTANCE," which claims the benefit of U.S. Provisional Patent application Ser. No. 61/860,692 entitled "DEVICE FOR REDUCING VEHICLE AERODYNAMIC RESISTANCE" filed on Jul. 31, 2013. The entirety of the above-noted applications are incorporated by reference herein.

ORIGIN

The innovation disclosed herein relates to a device that reduces the aerodynamic resistance of a moving vehicle and more particularly to a system of foldable (or collapsible) panels (or airfoils) attached to a rear of the vehicle that reduces the aerodynamic resistance acting on the vehicle.

BACKGROUND

With today's focus on being "green" and enhancing fuel efficiencies, there has been growing emphasis on increasing vehicle and particular long-haul truck aerodynamics. In accordance therewith, manufacturers and third-parties have designed and developed a wide variety of aerodynamic solutions that reduce wind drag upon tractors and trailers including fairings, skirts, under-body devices and the like.

One particular line of products used to address aerodynamics of a long-haul truck is the trailer skirt. A trailer skirt is essentially a downward extension of the trailer sides, particularly between the landing gear and the rear wheels that prevent accumulation of air beneath the trailer. Thus, aerodynamics and fuel efficiency can be enhanced by directing air down the side of the trailer decreasing air drag on the trailer.

To enhance effectiveness of trailer skirts, recently, efforts have turned toward development of effective solutions in the field of trailer tails or rear fairings. These devices, mounted upon the rear of a long-haul trailer, can improve management of the air flow thereby enhancing aerodynamics while at the same time reducing wind drag and fuel consumption. Unfortunately, many existing products are heavy, cumbersome to operate, difficult to install and expensive to manufacture, thereby detracting from their viability as an effective and cost efficient mechanism to enhance vehicle aerodynamics.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

In an aspect of the innovation an aerodynamic resistance reduction system is disclosed that includes a pair of vertical panels pivotally attached to a rear end adjacent to rear vertical edges of a vehicle and a first horizontal panel assembly pivotally attached to a top end to each of the pair of vertical panels and pivotally attached to the rear end adjacent to a top horizontal edge of the vehicle, the first horizontal panel assembly having separate overlapping panels. The first horizontal panel assembly includes a plurality of panels that pivot with respect to each other to facilitate the folding and unfolding of the system.

In another aspect of the innovation an aerodynamic resistance reduction system configured to attach to a rear end of a tractor trailer is disclosed that includes a first vertical panel pivotally attached to a first rear swinging door adjacent to one rear vertical corner of the tractor trailer, a second vertical panel pivotally attached to a second rear swinging door adjacent to an opposite rear vertical corner of the tractor trailer, a first horizontal panel assembly pivotally attached to a top end of the first vertical panel and to a top end of the second vertical panel and pivotally attached to the first rear swinging door and the second rear swinging door. The first horizontal panel assembly includes a plurality of panels that pivot with respect to each other to facilitate the folding and unfolding of the system.

In still yet another aspect of the innovation, a method reducing aerodynamic resistance on a vehicle is disclosed and includes pivoting a plurality of panels about a plurality of axes including, pivoting a first vertical side panel about an axis such that the first vertical side panel extends vertically outward from a rear end of the vehicle, pivoting a second vertical side panel about an axis such that the second vertical side panel extends vertically outward from a rear end of the vehicle, pivoting a first upper outside horizontal panel about an axis defined between a top end of the first vertical side panel and an outside edge of the first upper outside horizontal panel such that the first upper outside horizontal panel extends horizontally outward from a rear end of the vehicle, pivoting a second upper outside horizontal panel about an axis defined between a top end of the second vertical side panel and an outside edge of the second upper outside horizontal panel such that the second upper outside horizontal panel extends horizontally outward from a rear end of the vehicle, pivoting a first upper center horizontal panel about an axis defined between an angled edge on the first upper outside horizontal panel and an angled edge on the first upper center horizontal panel such that the first upper center horizontal panel extends horizontally outward from a rear end of the vehicle, and pivoting a second upper center horizontal panel about an axis defined between an angled edge on the second upper outside horizontal panel and an angled edge on the second upper center horizontal panel such that the second upper center horizontal panel extends horizontally outward from a rear end of the vehicle.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIGS. 8 and 9 are left and right side views from an inside of the innovative aerodynamic resistance reduction device in accordance with the innovation.

FIGS. 22 through 25 illustrate a sequence of opening a door on the vehicle and the collapsing of the innovative aerodynamic resistance reduction device in accordance with the innovation.

DETAILED DESCRIPTION

Figure 1:
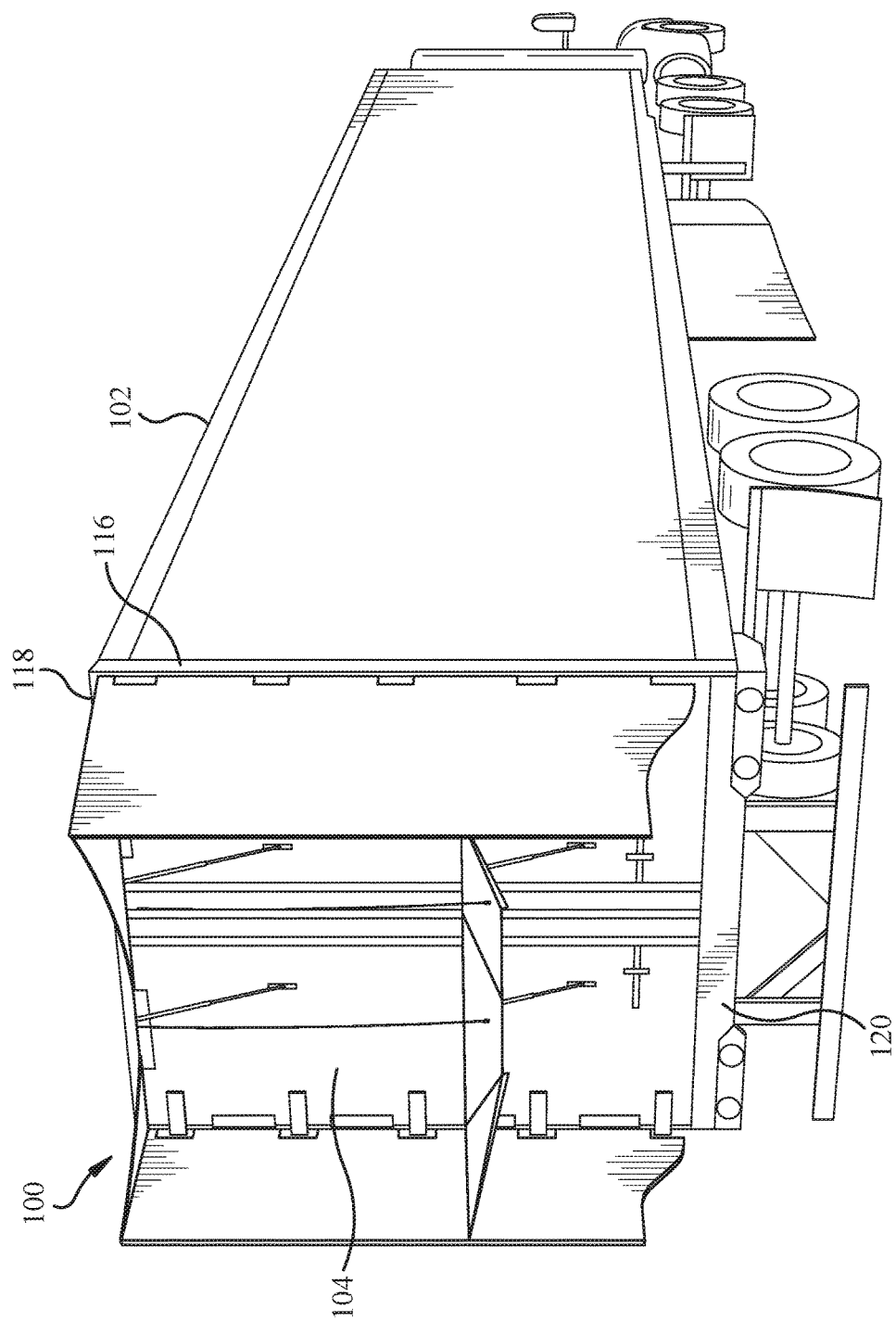
FIG. 1 is a rear perspective view from a rear of a vehicle incorporating an innovative aerodynamic resistance reduction device in accordance with the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein (e.g., thickness), it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Figure 2:
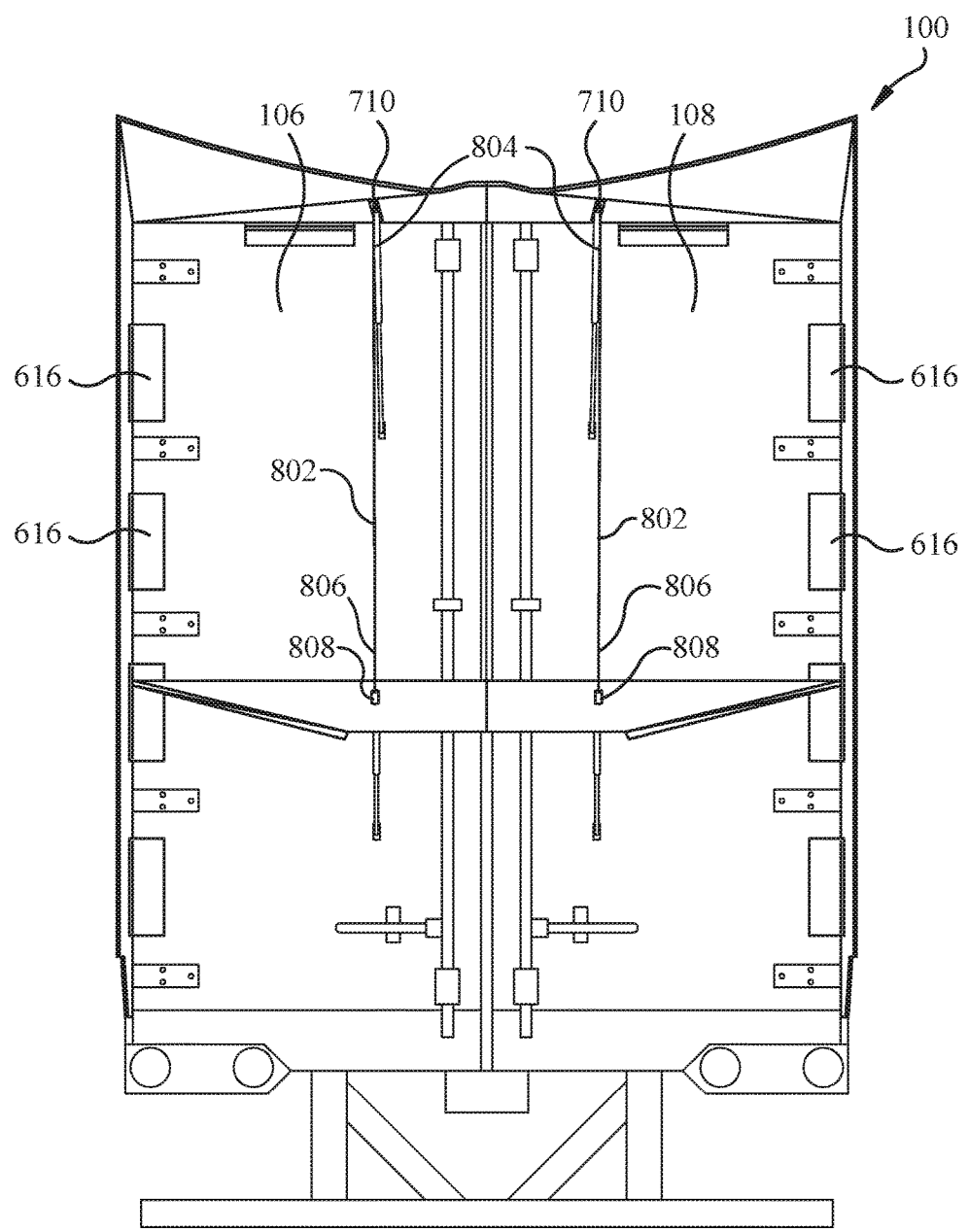
FIG. 2 is a rear view from the rear of the vehicle incorporating the innovative aerodynamic resistance reduction device in accordance with the innovation.

With reference now to the figures, FIGS. 1 and 2 are perspective and plan views of an example embodiment of an aerodynamic resistance reduction system 100 attached to a movable vehicle 102 in accordance with an aspect of the innovation. Specifically, the system 100 is configured to attach to a rear end 104 of the movable vehicle 102 that has a generally rectangular-flat rear end with a pair of swinging doors 106, 108, such as but not limited to a tractor trailer, to reduce aerodynamic drag. For purposes of illustration, any reference to "curb side" indicates the side of the vehicle closet to the curb and any reference to "road side" indicates the side of the vehicle furthest from the curb. Thus, the pair of swinging doors 106, 108 will be designated as a first (roadside) door 106 and a second (curbside) door 108. In addition, for purposes of illustration only, the roadside door 106 will be designated as the door that closes first. Thus, the example embodiment described herein is for illustrative purposes only and is not intended to limit the scope of the innovation.

As will be described below, the system 100 includes multiple interconnected panels (or airfoils) that pivot about an axis on the rear of the vehicle from a collapsed position to an extended position and vice versa to thereby redirect the wake airflow at the rear end of the vehicle to reduce aerodynamic drag. The panels may be made of flat sheets of pliable and resilient material capable of bending and automatically returning to an original shape. The panels are configured such that when the rear doors 106, 108 are opened the panels pivot into a collapsed state between the sides of the vehicle 102 and the doors 106, 108 allowing the doors 106, 108 to swing into an open position.

In addition, while aspects described herein describe the system as being mounted or disposed at or near the rear end of the vehicle such that the system does not extend beyond the sides or top of the vehicle, it is to be understood that the system may be offset so as to extend beyond the sides and top of the vehicle to enable air flow to be directed into the system and around the rear end. In operation, this air flow can be used to manage drag effect (e.g., control vortices), automatically deploy a tail device at speed through aerodynamic forces, enhance effect on drag, or the like.

Figure 3:
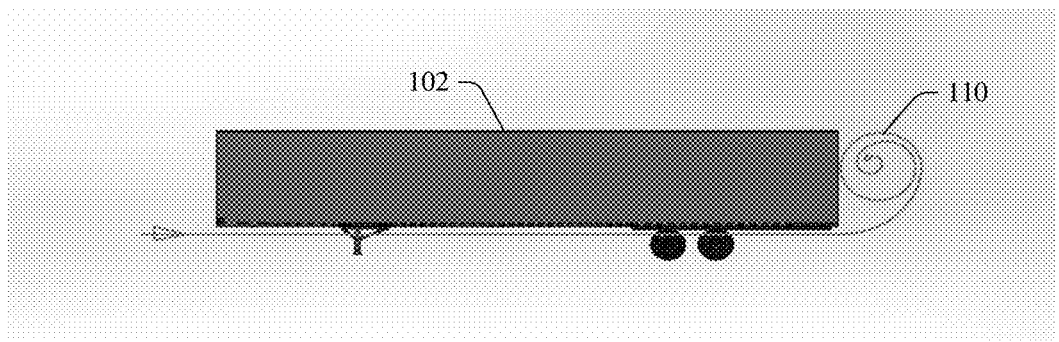
FIG. 3 is a side view of the vehicle illustrating an airflow affects to the vehicle without the innovative aerodynamic resistance reduction device in accordance with the innovation.
Figure 4:
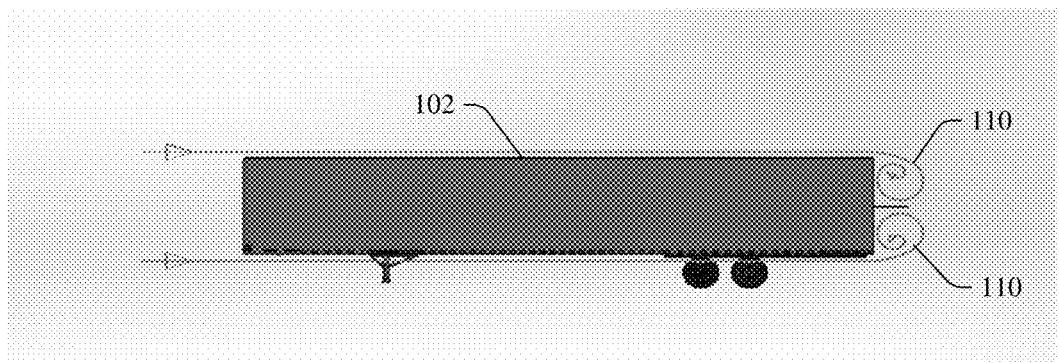
FIG. 4 is a side view of the vehicle illustrating an airflow affects to the vehicle with the innovative aerodynamic resistance reduction device in accordance with the innovation.

FIG. 3 is an illustration of a vehicle 102 illustrating the airflow and vortex 110 created without implementation of the innovative system 100. The vortex creates a drag on the vehicle thereby increasing resistance and decreasing fuel efficiency. The implementation of the system 100 having multiple panels, redirects the airflow to reduce the drag on the vehicle. For example, FIG. 4 represents redirected airflow using a three panel assembly system. As illustrated, the vortex 110 is divided in two halves, which reduces drag. The innovation disclosed herein, however, includes a four panel assembly system that achieves similar if not better results.

Figure 5:
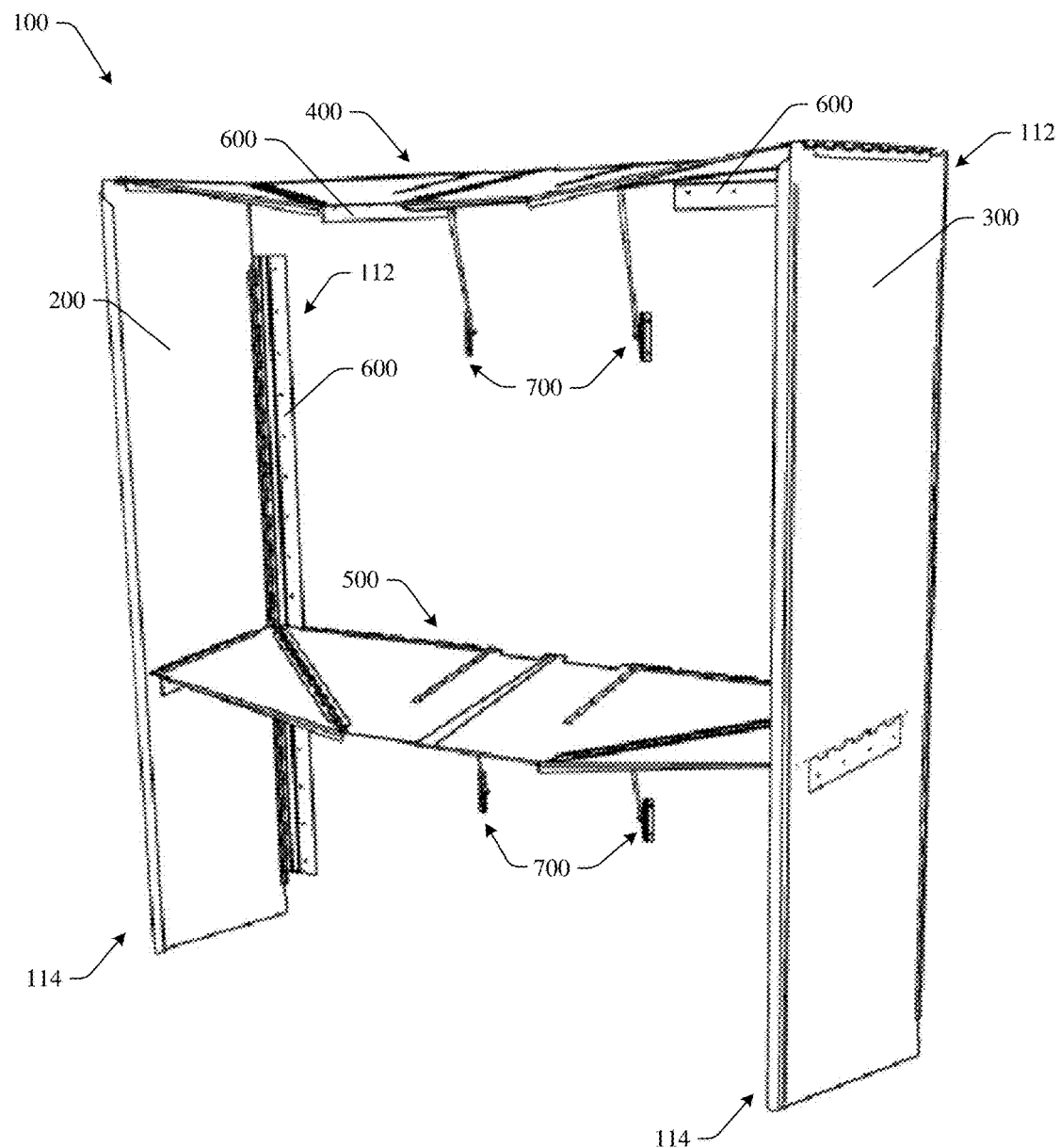
FIG. 5 is a perspective view from a distal side of the innovative aerodynamic resistance reduction device in accordance with the innovation.
Figure 6:
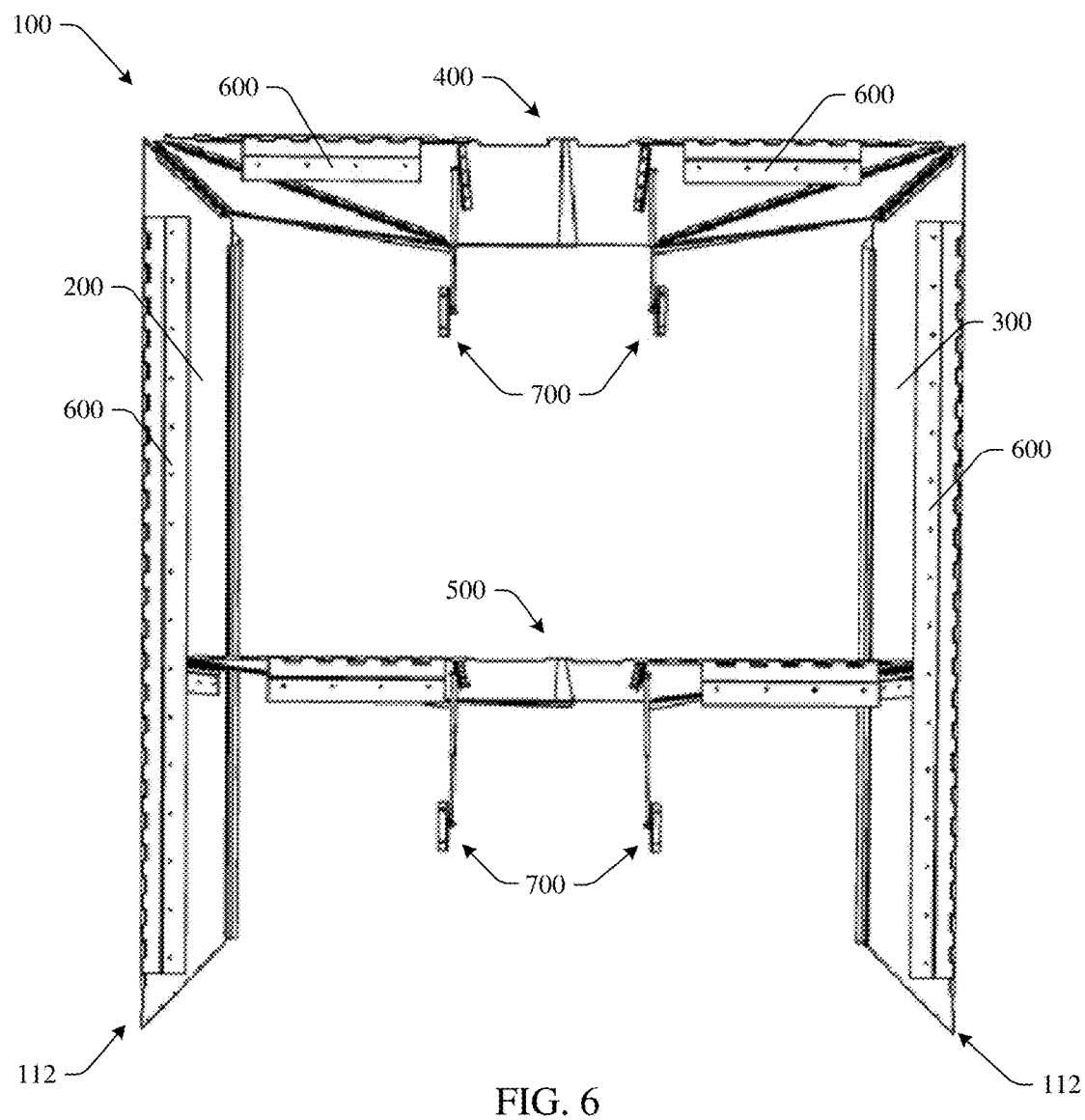
FIG. 6 is a plan view from a proximal side of the innovative aerodynamic resistance reduction device in accordance with the innovation.
Figure 7:
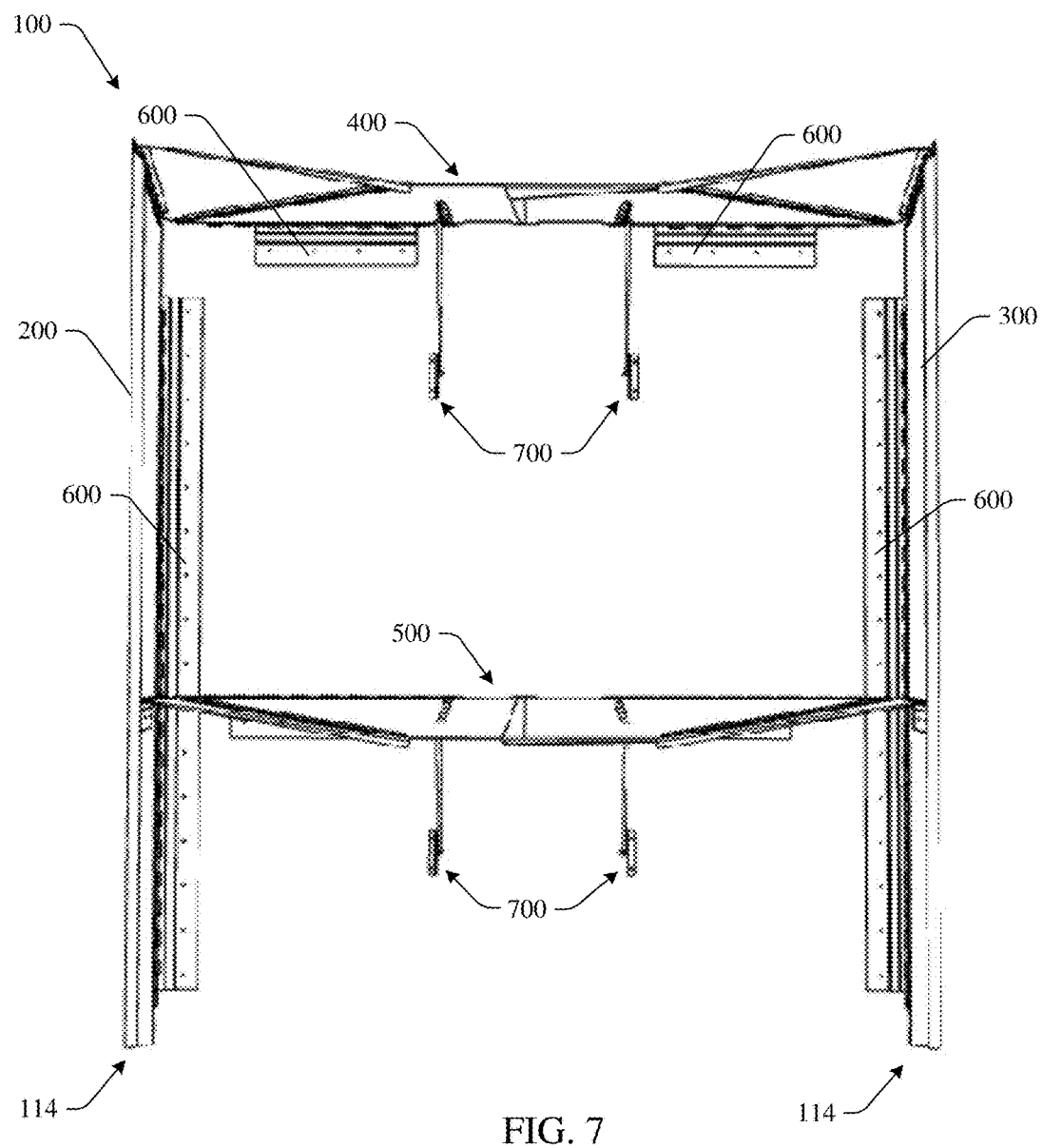
FIG. 7 is a plan view from the distal side of the innovative aerodynamic resistance reduction device in accordance with the innovation.

Referring now to FIGS. 5-7, the system 100 includes a first side 112, which will be designated as the side of the system 100 that attaches to (or is proximate to) the rear end 104 (more specifically, to the first and second doors 106, 108) of the vehicle 102, and a second side 114 of the system 100, which will be designated as the side away (distal side) from the rear end 104 of the vehicle 102. As mentioned above, the system 100 includes multiple interconnecting-pivoting panels including a vertically disposed first (road) side panel 200, a vertically disposed second (curb) side panel 300, a first (upper) horizontal panel assembly 400, a second (lower) horizontal panel assembly 500, multiple mounting hinges 600 that attach the system 100 to the rear end of the trailer and multiple compressible actuators 700.

Figure 10:
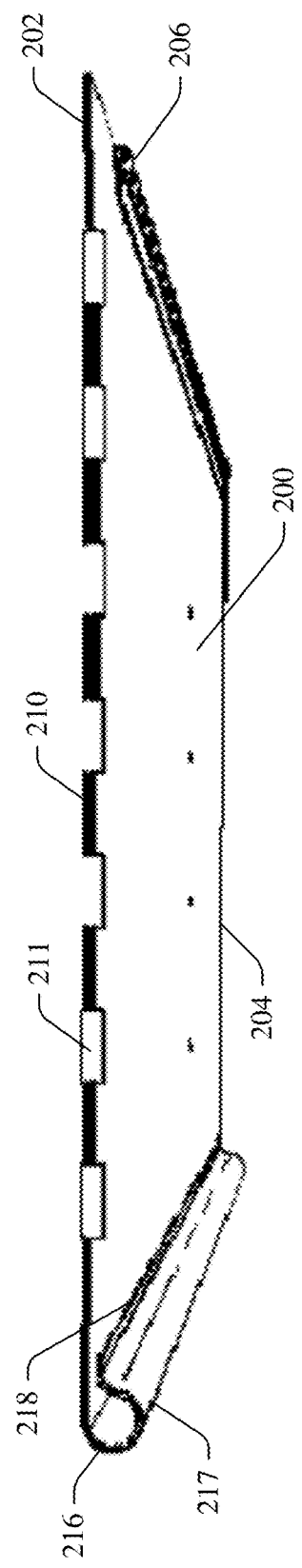
FIG. 10 is a top perspective view of the left side panel innovative aerodynamic resistance reduction device in accordance with the innovation.

Referring also to FIGS. 8-10, the side panels 200, 300 are mirror images of each other and, thus, will be described simultaneously. The side panels 200, 300 are disposed on opposite ends of the system 100 and pivotally attach to the rear end 104 of the vehicle 102 adjacent to rear vehicle vertical edges 116. The side panels 200, 300 include a first (top) end 202, 302, a second (bottom) end 204, 304, a first side (edge) 206, 306 proximate to the rear end 104 of the vehicle 102, and a second side (edge) 208, 308 distal from the rear end 104 of the vehicle 102. The side panels 200, 300 may be flat, contoured, curved, etc. When the vehicle is in motion and the system 100 is installed and deployed, the side panels 200, 300 are arranged such that an angle between an inside surface of each side panel 200, 300 and the rear doors is less than 90 degrees.

The first end 202, 302 of each side panel 200, 300 includes an integrated hinge 210, 310 having multiple knuckles 211, 311 that interacts with the first horizontal panel assembly 400, as will be described further below. The second end 204, 304 may be angled in such a way that the first side 206, 306 is longer than the second end 208, 308. The angled end enables the side panels 200, 300 to fold or pivot toward the rear end 104 of the vehicle 102 without interfering with handles, locks, etc. on the rear end 104 of the vehicle 102.

Figure 11:
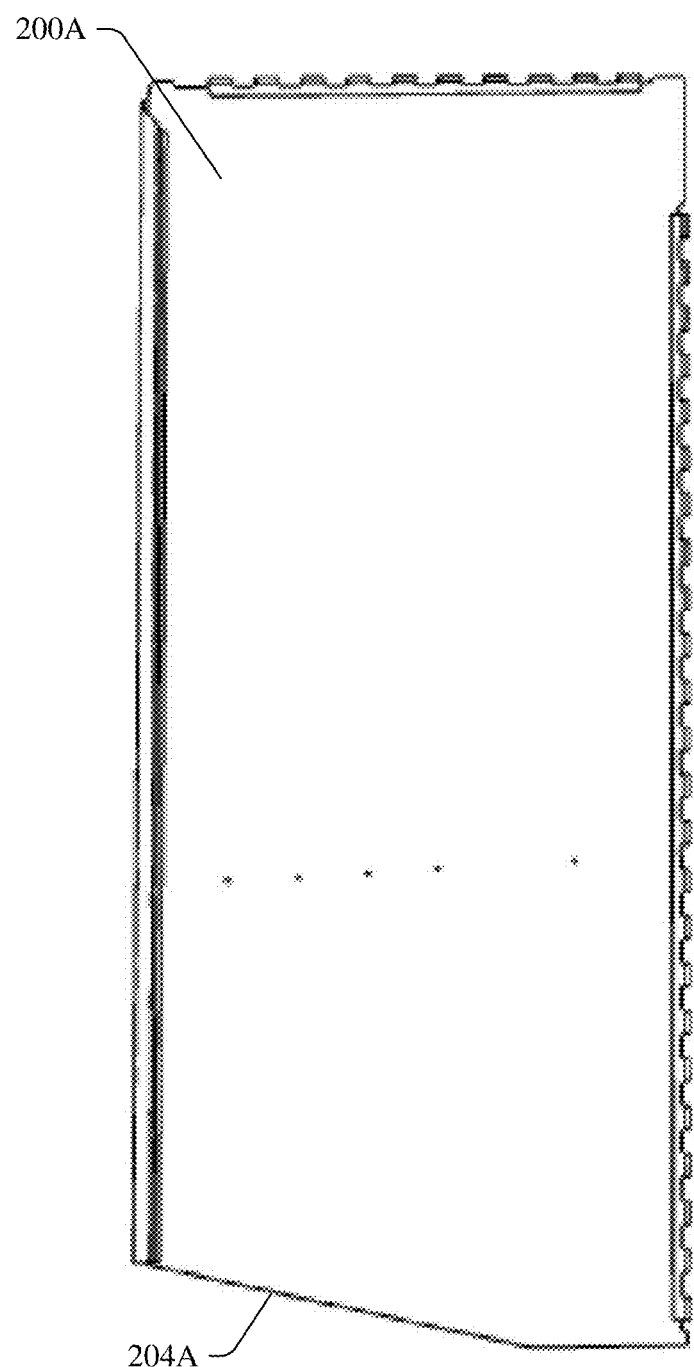
FIG. 11 is a side view of an alternative embodiment of the innovative aerodynamic resistance reduction device in accordance with the innovation.

In alternate embodiments, the second end 204, 304 may have a different angle, may have a straight portion and an angled portion, may be curved, etc. For example, FIG. 11 illustrates as alternate example embodiment of the angled second end 204A. In addition, FIG. 1 illustrates side panels 200, 300 having a curved second end 204, 304.

The first side 206, 306 also includes an integrated hinge 212, 312 that facilitates the attachment of the side panel 200, 300 to the rear end 104 of the vehicle 102, as will be described further below. The integrated hinge 212, 312 includes multiple knuckles 214, 314 and may be continuous and extend an entire length (or a portion thereof) of the first side 206, 306 or may be non-continuous and extend along multiple portions of the first side 206, 306. The method of forming the integrated hinge for all the panels will be described further below. It is to be understood, that the integrated hinges described herein for various panels have similar features and functions and, thus, similar features and functions will not be repeated throughout.

Both side panels 200, 300 may include cutouts 219, 319 at various points along the first side 306 to account for objects (e.g., locks, handles, trailer hinges, etc.) on the vehicle.

The second side 208, 308 may include an integrated stiffening device 216, 316 that serves multiple functions. First the stiffening device 216, 316 provides rigidity for the side panels 200, 300 so they do not bow due to aero lift force. Second, the stiffening device 216, 316 provides durability and a rigid structure to facilitate manual opening and closing of the side panels 200, 300. The stiffening device 216, 316 runs along all or a part of the second edge 208, 308 of each side panel 200, 300 and may have any shaped cross section to facilitate rigidness. For example, the cross section may be circular, triangular, L-shaped, V-shaped, etc.

In the embodiment illustrated in the figures and as best shown in FIG. 10 (first side panel only for illustrative purposes), the cross section has a semi-circular shaped portion 217 with a lip portion 218 that is substantially parallel with the side panel 200. In example embodiments, the lip portion 218 may or may not contact the side panel 200. Thus, a gap may or may not exist between the lip portion 218 and the side panel 200. The stiffening device is simply formed by heating the second edge 208 of the side panel 200 and forming the edge around a rod or other elongated shape. Once the side panel 200 is cooled the rod is removed from the side panel 200.

Multiple attachment holes 220, 320 are defined in each side panel 200, 300 to facilitate the attachment of an attachment hinge. The attachment hinge is used to pivotally attach each side of the second horizontal panel assembly 500 to each side panel 200, 300, as will be described further below.

Figure 12:
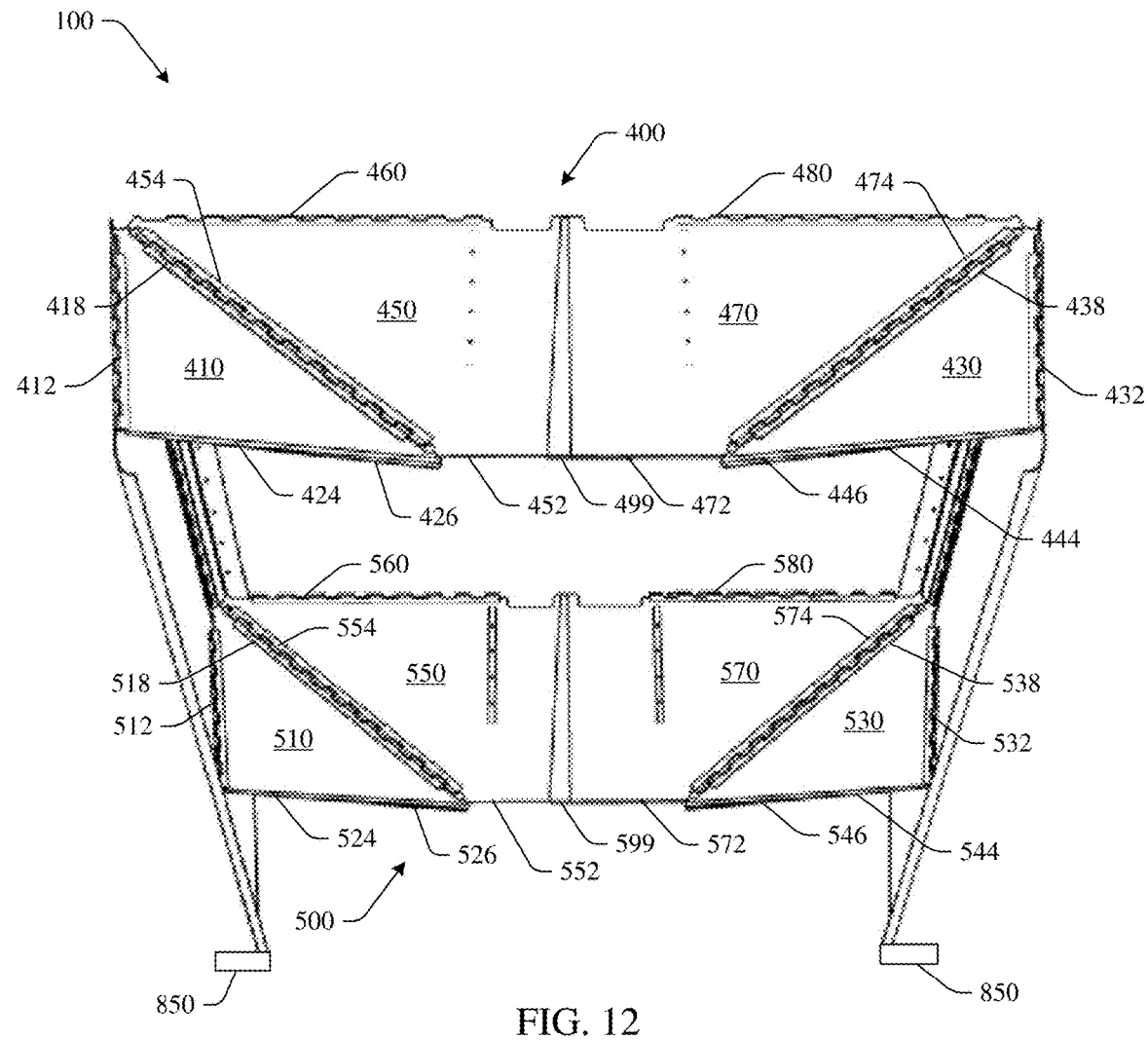
FIG. 12 is a perspective view from a top distal side of the innovative aerodynamic resistance reduction device in accordance with the innovation.
Figure 13:
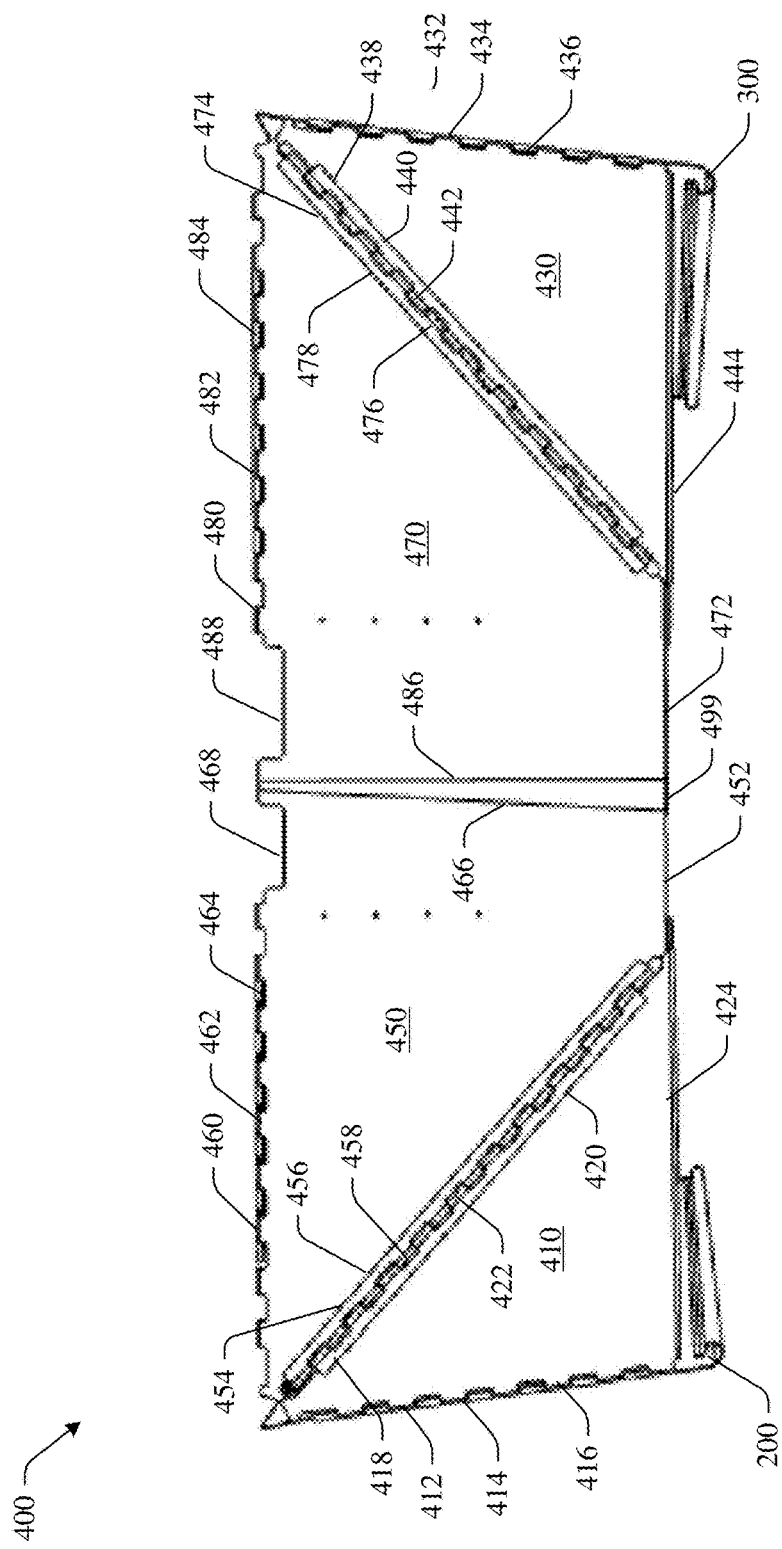
FIG. 13 is a top view of a horizontal panel assembly in accordance with the innovation.

Referring now to FIGS. 12 and 13, the first horizontal panel assembly 400 is located near a top horizontal edge 118 of the rear end 104 of the vehicle 102 and includes a first outside (road side) panel 410, a second outside (curb side) panel 430, a first center (road side) panel 450, and a second center (curb side) panel 470. The first horizontal panel assembly 400 can be adjusted (e.g., yaw, angle, placement, etc.) as appropriate to maximize or attain a desired effect or performance. In one example, the horizontal panel can be adjusted based upon speed, weather, air density or the like.

The outside panels 410, 430 are triangular in shape and include a first edge 412, 432 having an integrated hinge 414, 434 with multiple knuckles 416, 436, an angled second edge 418, 438 having an integrated hinge 420, 440 with multiple knuckles 422, 442, and a third edge 424, 444 having a stiffener 426, 446. The stiffener 426, 446 may have an L-shape and tapers as the stiffener 426, 446 extends from the second edge 418, 438 toward the first edge 412, 432.

The integrated hinges 414, 434, 420, 440 may be continuous and extend an entire length (or a portion thereof) of the first edge 412, 432 and/or second edge 418, 438 respectively or may be non-continuous and extend along multiple portions of the first edge 412, 432 and/or second edge 418, 438 respectively.

The center panels 450, 470 are generally triangular in shape and include a first edge 452, 472, an angled second edge 454, 474 having an integrated hinge 456, 476 with knuckles 458, 478, a third edge 460, 480 having an integrated hinge 462, 482 with knuckles 464, 484, and a fourth edge 466, 486. The integrated hinges 456, 476, 462, 482 may be continuous and extend an entire length (or a portion thereof) of the first edge 452, 472 and/or second edge 454, 474 respectively or may be non-continuous and extend along multiple portions of the first edge 452, 472 and/or second edge 454, 474 respectively. The third edge 460, 480 may include cutouts 468, 488 to account for handles, lock rods, hinges, etc.

Figure 12A:
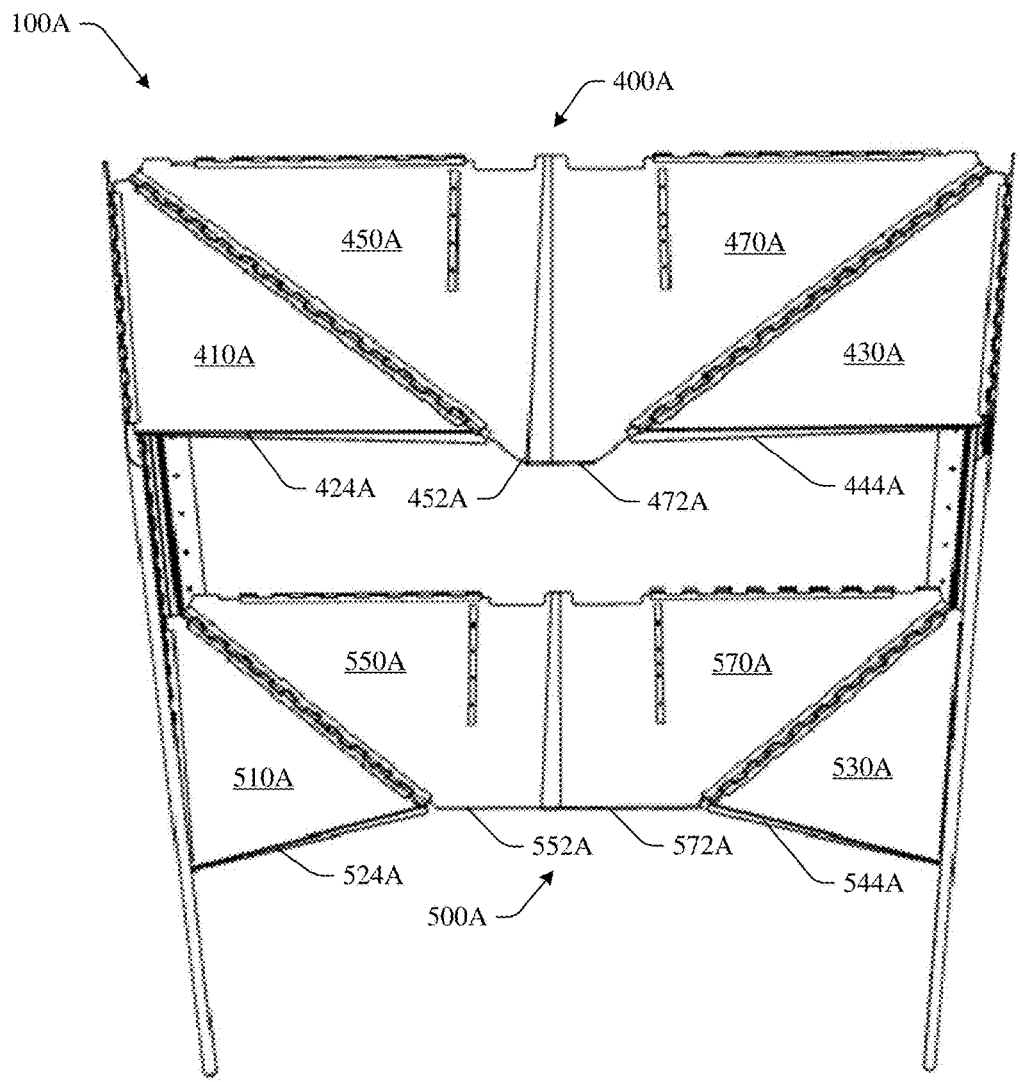
FIG. 12A is a perspective view from a top distal side of an alternate example embodiment of the innovative aerodynamic resistance reduction device in accordance with the innovation.

It is to be understood that the innovation is not dependent on the shape of the outside panels 410, 430 or the center panels 450, 470. For example, FIG. 12A illustrates an alternative embodiment of the system 100A where the first horizontal panel assembly 400A has center panels 450A, 470A that include a first edge 452A, 472A that extends past a first edge 424A, 444A of the outside panels 410, 430. Thus, it is to be understood that the shape of all the panels disclosed herein and illustrated in the figures is for illustrative purposes only and is not intended to limit the scope of the innovation.

A width of one of the center panels located on the door that closes first is shorter than a width of the other center panel located on the door that closes second. This is to accommodate the closing of the vehicle doors without having any interference from either center panel. For example, assuming that the road side door closes first, a width (the distance from the second edge 454, 474 to the fourth edge 466, 486) of the first center panel 450 is less than a width of the second center panel 470. As such, the first center panel 450 does not extend past an edge of the roadside vehicle door. On the other hand, the second center panel 470 does extend past an edge of the curb side vehicle door and overlaps the first center panel 450. In this example, the road side vehicle door closes first and then the curb side vehicle door closes second. Thus, the curb side vehicle door is able to close without interference from the first center panel 450.

Figure 19:
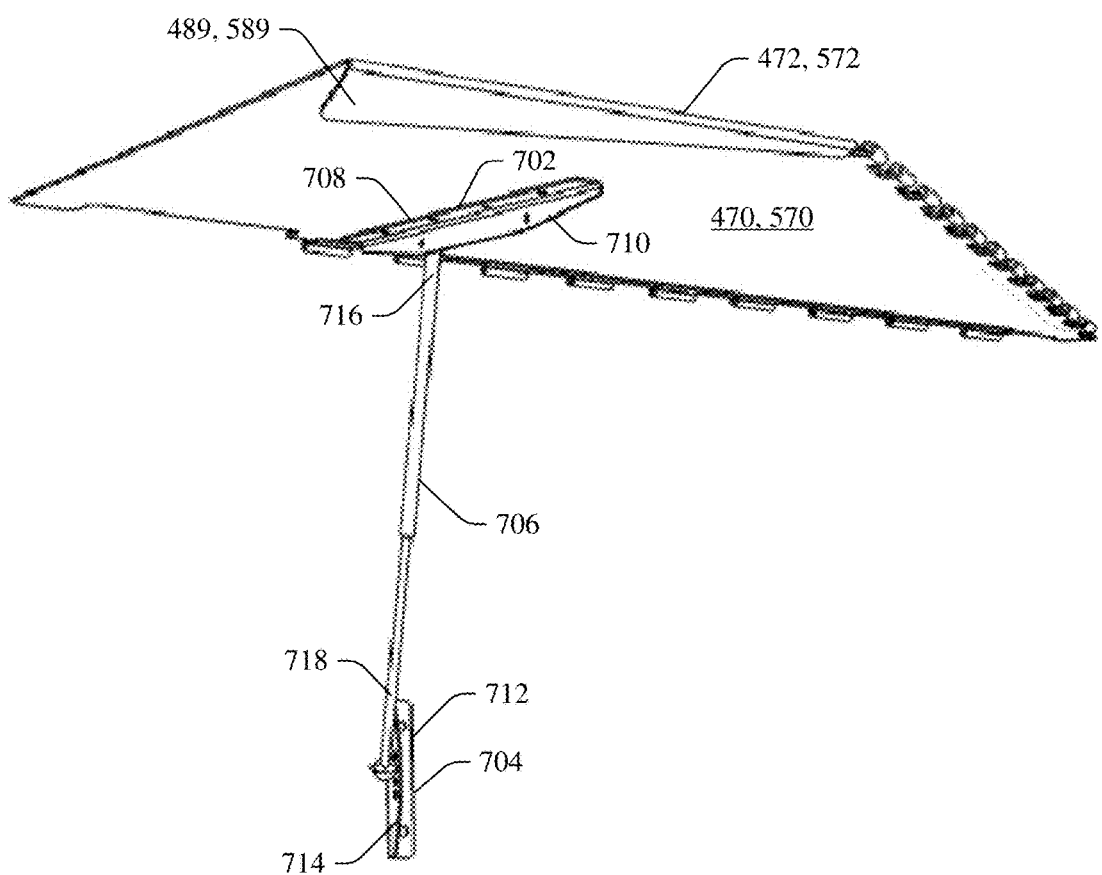
FIG. 19 is a perspective view of a center panel including a compressible actuator in accordance with the innovation.

The second center panel 470 includes a catch mechanism 489 disposed on the first edge 472, best shown in FIG. 19. The catch mechanism may have any shape such as, but not limited to, a V-shape. The catch mechanism 489 receives the first edge 452 of the first center panel 450 to lock the two center panels 450, 470 together while in operation. This prevents the center panels 450, 470 from separating while in operation, which would reduce performance.

In an assembled state the integrated hinge 414, 434 of the first edge 412, 432 of the outside panels pivotally mate with the integrated hinge 210, 310 of the top end 202, 302 of each side panel 200, 300. In addition, the integrated hinge 420, 440 of the angled second edge 418, 438 of the outside panels 450, 470 pivotally mate with the integrated hinge 456, 476 of the angled second edge 454, 474 of the center panels 450, 470. Thus, while in operation and as previously mentioned, the center panels 450, 470 overlap and, thus, this arrangement forms the first horizontal panel assembly 400. In addition, the integrated hinges 418, 438 of the angled second edge 416, 436 of the outside panels 450, 470 are offset from the integrated hinges 456, 476 of the angled second edge 454, 474 of the center panels 450, 470. This arrangement facilitates the collapse or folding of the second horizontal panel assembly 400 when the vehicle is not in motion.

In a collapsed or folded position, the first horizontal panel assembly 400 folds such that the two center panels 450, 470 separate and fold, as will be described further below.

Figure 14:
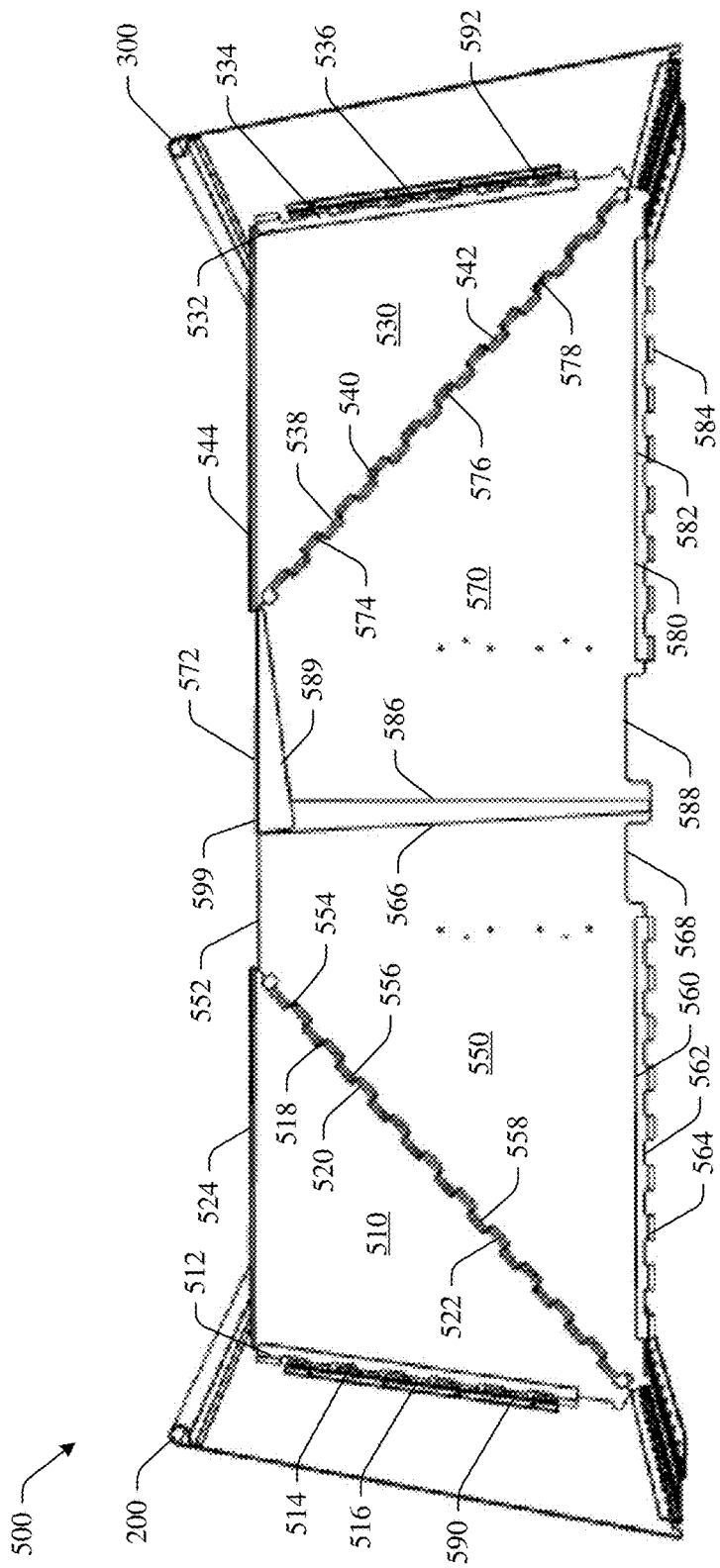
FIG. 14 is a bottom view of a horizontal panel assembly in accordance with the innovation.

Referring now to FIGS. 12 and 14, the second horizontal panel assembly 500 is located between the first horizontal panel assembly 400 and a lower edge 120 of the rear end 104 of the vehicle 102. In one example embodiment, the second horizontal panel assembly 500 is located near a midpoint of the rear end 104 of the vehicle 102. In other example embodiments, the second horizontal panel assembly 500 may be located above, at, or below the midpoint of the rear end 104 of the vehicle 102. In another embodiment, the second horizontal panel assembly 500 may extend out away from the rear end 104 of the vehicle 102 a distance less than the first horizontal panel assembly 400. This is to allow the second horizontal panel assembly 500 to hang down when collapsed without interfering with the vehicle handles, locks, etc.

In addition, the second horizontal panel assembly 500 can be adjusted (e.g., yaw, angle, placement, etc.) as appropriate to maximize or attain a desired effect or performance. In one example, the horizontal panel can be adjusted based upon speed, weather, air density or the like.

The second horizontal panel assembly 500 not only functions to reduce aerodynamic resistance, but also serves to provide support to each of the side panels 200, 300 near a central location of the side panels 200, 300. Thus, in embodiments, the presence of the second horizontal panel assembly 500 reduces and may eliminate the need for additional support hardware to provide support and stability to the side panels 200, 300, thereby increasing manufacturing and installation efficiency, which in turn reduces manufacturing and production costs.

The second horizontal panel assembly 500 includes a first outside (road side) panel 510, a second outside (curb side) panel 530, a first center (road side) panel 550, a second center (curb side) panel 570, and a pair (first and second) of attachment hinges 590, 592. The outside panels 510, 530 are triangular in shape and include a first edge 512, 532 having an integrated hinge 514, 534 with knuckles 516, 536, an angled second edge 518, 538 having an integrated hinge 520, 540 with multiple knuckles 522, 542, and a third edge 524, 544 having a stiffener 526, 546. The stiffener 526, 546 may have an L-shape and tapers as the stiffener 526, 546 extends from the angled second edge 518, 538 toward the first edge 512, 532.

The center panels 550, 570 are generally triangular in shape and include a first edge 552, 572, an angled second edge 554, 574 having an integrated hinge 556, 576 with knuckles 558, 578, a third edge 560, 580 having an integrated hinge 562, 582 with knuckles 564, 584, and a fourth edge 566, 586. The integrated hinges 556, 576, 562, 582 may be continuous and extend an entire length (or a portion thereof) of the first edge 552, 572 and/or second edge 554, 574 respectively or may be non-continuous and extend along multiple portions of the first edge 552, 572 and/or second edge 554, 574 respectively. The third edge 560, 580 may include cutouts 588 to account for handles, lock rods, hinges, etc.

A width of one of the center panels located on the door that closes first is shorter than a width of the other center panel located on the door that closes second. This is to accommodate the closing of the vehicle doors without having any interference from either center panel. For example, assuming that the road side door closes first, a width (the distance from the second edge 554, 574 to the fourth edge 566, 586) of the first center panel 550 is shorter that a width of the second center panel 570. As such, the first center panel 550 does not extend past an edge of the roadside vehicle door. On the other hand, the second center panel 570 does extend past an edge of the curb side vehicle door and overlaps the first center panel 550. In this example, the road side vehicle door closes first and then the curb side vehicle door closes second. Thus, the curb side vehicle door is able to close without interference from the first center panel 550.

The second center panel 570 includes a catch mechanism 589 disposed on the first edge 572, best shown in FIG. 19. The catch mechanism may have any shape such as, but not limited to, a V-shape. The catch mechanism 589 receives the first edge 552 of the first center panel 550 to lock the two center panels 550, 570 together while in operation. This prevents the center panels 550, 570 from separating while in operation, which would reduce performance.

Figure 15:
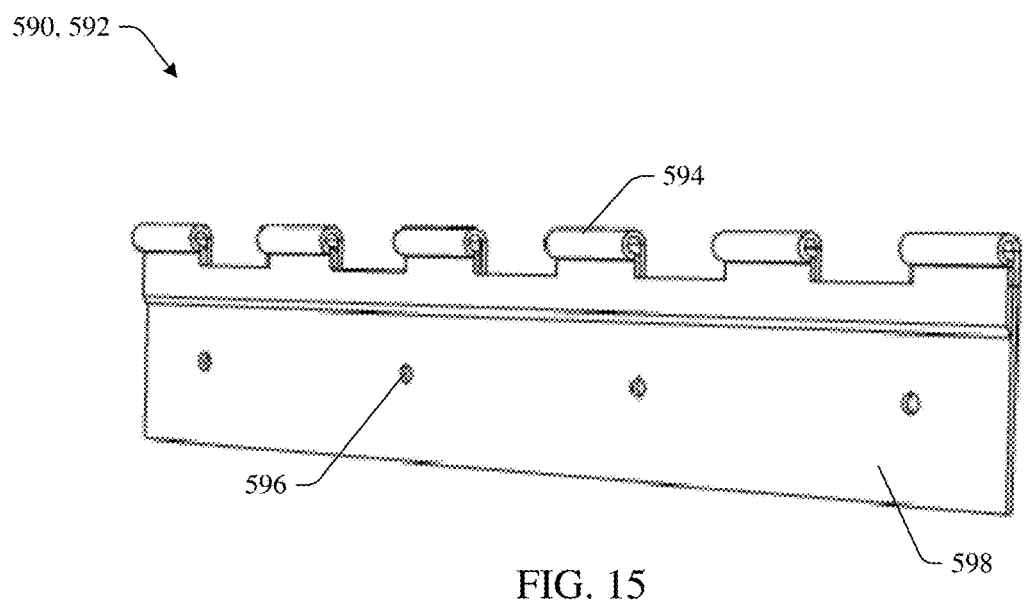
FIG. 15 is a perspective view of an attachment hinge in accordance with the innovation.

Referring to FIG. 15, the attachment hinges 590, 592 include multiple knuckles 594 and mounting holes 596 defined in a mounting portion 598. The attachment hinges 590, 592 attach to an inside surface of each side panel such that the mounting holes 596 align with the attachment holes 220, 320 defined in each side panel 200, 300. It is to be appreciated that the attachment hinges can be an integrated portion of each side panel 200, 300. Thus, the second horizontal panel assembly 500 can attach to each side panel 200, 300 without the need for an additional hinge.

In an assembled state the integrated hinge 514, 534 of the first edge 512, 532 of the outside panels 550, 570 pivotally mate with the attachment hinges 590, 592. In addition, the integrated hinge 518, 538 of the angled second edge 516, 536 of the outside panels 550, 570 pivotally mate with the integrated hinge 556, 576 of the angled second edge 554, 574 of the center panels 550, 570. Thus, while in operation and as previously mentioned, the center panels 550, 570 overlap and, thus, this arrangement forms the second horizontal panel assembly 500. In addition, the integrated hinges 518, 538 of the angled second edge 516, 536 of the outside panels 550, 570 are offset from the integrated hinges 556, 576 of the angled second edge 554, 574 of the center panels 550, 570. This arrangement facilitates the collapse or folding of the second horizontal panel assembly 500 when the vehicle 102 is not in motion.

As mentioned above, it is to be understood that the innovation is not dependent on the shape of the outside panels 510, 530 or the center panels 550, 570. For example, referring back to the alternative embodiment of the system 100A in FIG. 12A, the second horizontal panel assembly 500A that has outside panels 510A, 530A that includes an angled third edge 524A, 544A with respect to the first edge 552A, 572A of the center panels 550A, 570A. The third edge 524A, 544A extends from the first edge 552A, 572A of the center panels 550A, 570A to the second (distal) edge 208A, 308A of each side panel 200, 300. This arrangement increases the stability and performance of the system 100. In addition, the shorter distance of the first and second center panels 550A, 570A allow for clearance from objects on the rear end 104 of the vehicle 102 when the system 100 is in a collapsed position. Thus, it is to be understood that the shape of all the panels disclosed herein and illustrated in the figures is for illustrative purposes only and is not intended to limit the scope of the innovation.

In one example embodiment, a distal end of each side panel 200, 300 extends away from the rear end 104 of the vehicle 102 further than a distal end of the panels in both the first and second horizontal panel assemblies 400, 500. This arrangement protects the system 100 in the event that the vehicle backs into an object or structure (e.g., a building, pole, etc.). In other words, if the vehicle 102 backs into an object, the distal side 208, 308 of each side panel 200, 300 will contact the object first. As mentioned above, since the angle between an inside surface of each side panel 200, 300 and the rear end 104 of the vehicle 102 is less than 90 degrees, as the distal side 208, 308 contacts the object, the side panels 200, 300 will begin to fold inward toward the rear end 104 of the vehicle 102. As such, both the first and second horizontal panel assemblies 400, 500 collapse, as described further below. As a result, the entire system 100 collapses or folds without damage to the panels.

In a collapsed or folded position, the second horizontal panel assembly 500 folds such that the two center panels 550, 570 separate and fold, as will be described further below.

Referring back to FIG. 12, both the first and second horizontal panel assemblies 400, 500 sag near a midpoint 499, 599 of each panel assembly 400, 500 that facilitates the collapse or folding of the first and second horizontal panel assemblies 400, 500 when the vehicle is not in motion. In other words, the first and second horizontal panel assemblies 400, 500 are angled in a downward direction as the panel assemblies 400, 500 extend from each side panel 200, 300 toward the midpoint 499, 599 such that an angle between the rear doors and a bottom surface of the first and second horizontal panel assemblies 400, 500 is less than 90 degrees.

Figure 16:
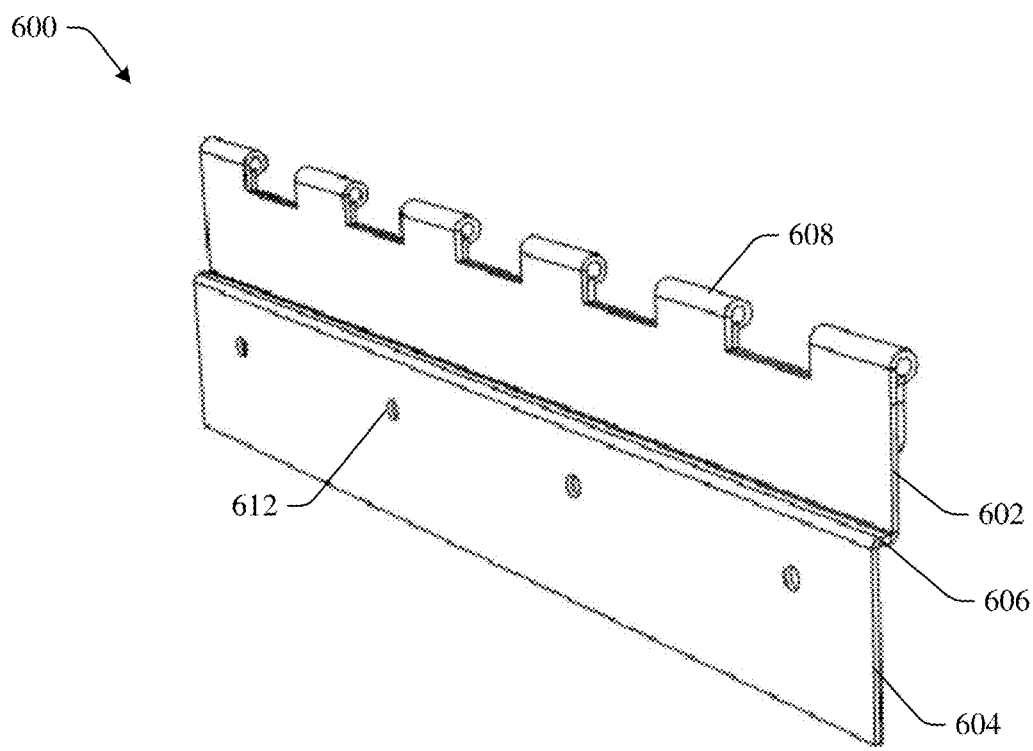
FIGS. 16 and 17 are opposite side perspective views of mounting hinges in accordance with the innovation.
Figure 17:
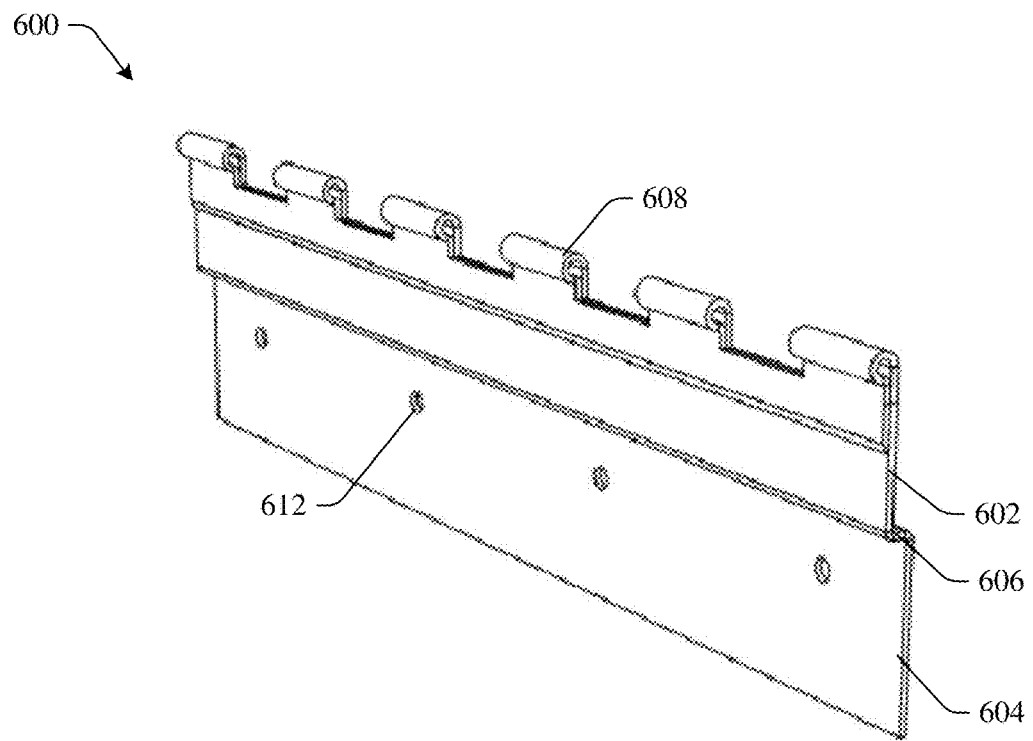

Referring to FIGS. 16 and 17, the mounting hinges 600 are configured to attach corresponding panels and, hence, the system 100 to the rear end 104 of the vehicle 100. In other example embodiments, the system 100 can be mounted to the vehicle using any type of fastening mechanism, such as but not limited to, an adhesive, double sided tape, etc. Still in other embodiments, mounting hinges may be integrated or incorporated into the swinging doors 106, 108. For example, the door panels for the doors can be made of a thicker material that have the mounting hinges formed therein.

The mounting hinges 600 are an integrated unit that includes a first plate 602, a second plate 604, and an offset (or jog) 606 that facilitates the mounting of the system 100 to the vehicle 102. Multiple knuckles 608 are cut into the first plate 602 and are configured to align adjacently with the knuckles on the integrated hinges on each corresponding panel to thereby create a pivot axis described in more detail further below.

A hinge pin (or rod) is inserted through the knuckles 608 on the mounting hinge 600 (and also on the attachment hinges 590, 592 described above) and through the knuckles on the corresponding panels to secure each mounting hinge 600 to the panel. The pin may be a glazed composite rod that includes a stop at one end and a removable fastener (e.g., cotter pin) at the opposite end to secure the pin in place. The stop may include a cap that can be threaded, glued, etc. on to the pin, an integrated expanded portion (e.g., ball, disk, etc.). It is to be understood that the pin can be used to pivotally lock adjoining panels together. Multiple mounting holes 612 are defined in the second plate that align with mounting holes on the rear end 104 of the vehicle 102 to thereby attach the system 100 to the vehicle 102.

In other embodiments, the hinge pin may be made from other materials, such as but not limited to, fiberglass (continuous fiber or chopped fiber), metal, plastic, polymers, etc. The hinge pin may include a sleeve made from a material, such as but not limited to, aluminum.

As mentioned above, the offset 606 facilitates mounting the system 100 to the vehicle 102. The offset 606 offsets the first plate 602 from the second plate 604 such that the first plate 602 and second plate 604 are is different planes. In addition, the mounting hinge 600 is arranged and mounted on the rear end 104 of the vehicle 102 such that a mounting surface 614 is in contact with the rear end 104 of the vehicle 102. Thus, when mounted, the first plate 602 and, hence, the knuckles 608 are offset from a rear surface of the vehicle 102. This offset allows the panels to pivot or rotate about the pivot axis (described below) without interference from the rear surface of the vehicle or any other device (e.g., handles, locks, etc.) located on the rear surface of the vehicle.

Figure 18:
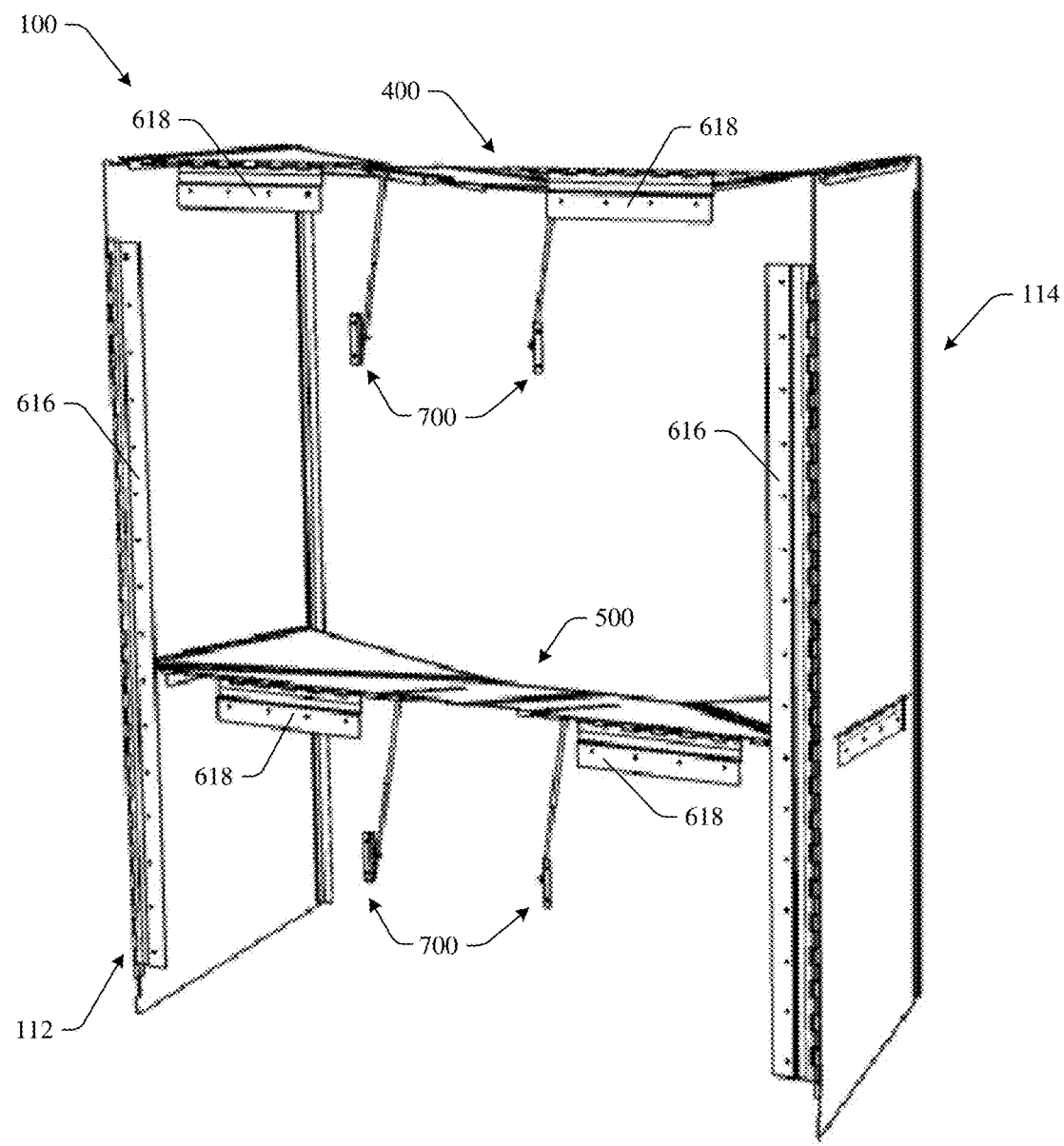
FIG. 18 is a perspective view from the proximal side of the innovative aerodynamic resistance reduction device in accordance with the innovation.

Referring to FIG. 18, the mounting hinges 600 include at least two side panel mounting hinges 616 and multiple horizontal panel assembly mounting hinges 618. The side panel mounting hinges 616 mate with the integrated hinge 212, 312 on the first side 206, 306 of each side panel 200, 300. In one embodiment, the side panel mounting hinges 616 may be continuous and extend an entire length (or a portion thereof) of the first side 206, 306 of each side panel 200, 300. In another embodiment, there may be multiple side panel mounting hinges 616 aligned with the non-continuous integrated hinge 212, 312 along multiple portions of the first side 206, 306 of each side panel 200, 300 mentioned above and as shown in FIG. 2.

The multiple horizontal panel assembly mounting hinges 618 attach to the first and second horizontal panel assemblies 400, 500. Specifically, at least one horizontal panel assembly mounting hinge 618 pivotally mates with each integrated hinge 462, 482 on the third edge 460, 480 of the first horizontal panel assembly 400 center panels 450, 470. In addition, at least one horizontal panel assembly mounting hinge 618 pivotally mates with each integrated hinge 562, 582 on the third edge 560, 580 of the second horizontal panel assembly 500 center panels 550, 570.

In one embodiment, the horizontal panel assembly mounting hinges 618 may be continuous and extend an entire length (or a portion thereof) of each integrated hinge 462, 482, 562, 582 of both the first and second horizontal panel assembly 400, 500 respectively. In another embodiment, there may be multiple horizontal panel assembly mounting hinges 618 aligned with the non-continuous integrated hinge 462, 482, 562, 582 along multiple portions of the third edge 460, 480, 560, 580 of both the first and second horizontal panel assemblies 400, 500 center panels 450, 470, 550, 570 respectively.

Referring to FIG. 19, the compressible actuator assemblies 700 disposed beneath both the first and second horizontal panel assemblies 400, 500 to deploy the system 100 and provide support to the first and second horizontal panel assemblies 400, 500 during operation. It is to be understood, that due to the actuator assemblies 700, the system 100 is in a deployed (un-collapsed) state, unless the doors 106, 108 are in an open position, as is described below, or unless the operator intentionally folds and latches the system 100. In other words, the actuator assemblies 700 bias the first and second horizontal panel assemblies 400, 500 to the unfolded position, which in turn pivots the side panels 200, 300 to the deployed position. The actuator assemblies 700 include a first L-shaped bracket 702, a second L-shaped bracket 704, and a compressible actuator (e.g., piston, gas spring, etc.) 706.

The first L-shaped bracket 702 includes a mounting plate 708 having multiple mounting holes defined therein and an attachment plate 710 having multiple attachment holes defined therein. The mounting plate 708 mounts to an underside surface of the center panels 450, 470, 550, 570 (only the center panels 470, 570 are illustrated in FIG. 19) via fasteners, such as but not limited to, nuts and bolts, rivets, etc., where the fasteners are inserted through the multiple attachment holes defined in the mounting plate 708 and mounting holes defined in the center panels 450, 470, 550, 570. The first L-shaped brackets 702 transfer force to the compressible actuators 706 when folding to minimize the risk of bending and/or breaking the center panels 450, 470, 550, 570. In addition, the first L-shaped bracket 702 functions as a stiffener to provide additional support to the center panels 450, 470, 550, 570.

The second L-shaped bracket 704 includes a mounting plate 712 having multiple mounting holes defined therein and an attachment plate 714 having multiple attachment holes defined therein. The mounting plate 712 mounts to a surface of the vehicle doors via fasteners, such as but not limited to, nuts and bolts, rivets, etc., where the fasteners are inserted through the multiple attachment holes defined in the mounting plate 712 and mounting holes defined in the vehicle doors.

A first end 716 of the compressible actuator 706 rotatably attaches to one of the multiple attachment holes defined in the attachment plate 710 of the first L-shaped bracket 702. A second end 718 of the compressible actuator 706 rotatably attaches to one of the multiple attachment holes defined in the attachment plate 714 of the second L-shaped bracket. It is to be understood that the compressible actuator 706 can be mounted with the first end 716 attached to second L-shaped bracket 704 and the second end 718 attached to the first L-shaped bracket 702.

Upon operation, the compressible actuators 706 will expand and contract to facilitate the pivoting motion of the first and second horizontal panel assemblies 400, 500 and, hence, the system 100. The first and second end 716, 718 can be mounted in any one of the attachment holes defined in the attachment plates 710, 714 to accommodate different supports 706 having different lengths and/or to adjust the angle of the first and second horizontal panel assemblies 400, 500.

Referring to back to FIG. 2, the system 100 may further include release cords 802 that facilitate the collapsing or folding of the system 100 when the vehicle is not in motion. The release cords 802 have a first end 804 that attaches to one of the holes in the attachment plate 710 in the first L-shaped bracket 702 attached to the underside of the first and second center panels 450, 470 of the first horizontal panel assembly 400. A second end 806 of each release cord 802 attaches to a fastener (e.g., I-bolt) 808 that fastens to the mounting plate 708 of the first L-shaped bracket 702 attached to the underside of the center panels 550, 570 of the second horizontal panel assembly 500. The fastener 808 extends through the center panels 550, 570 such that the second end 806 of the release cord 802 is attached on a top side of the center panels 550, 570.

In embodiments, the release cords can be employed as illustrated in expired U.S. Pat. No. 5,498,059 issued to Switlick on Mar. 12, 1996. Additionally, it is to be understood and appreciated that alternative and improved designs of release cords are to be included within the scope of this specification. By way of example and not limitation, pulleys, hardware, or the like that route the release cord(s) to a side panel(s) can be employed in alternative aspects. In other words, it is contemplated that aspects need not attach the top horizontal panel to the lower horizontal panel to assist in collapsing the system.

In other example embodiments, a handle or handles may be disposed on the second horizontal panel assembly 500 to facilitate the collapsing of the system. Thus, the release cords 802 may extend through the second horizontal panel assembly 500 and attach to a grommet and/or handle below the second horizontal panel assembly 500. Thus, the operator simply pulls on the handle while simultaneously pushing down on the second horizontal panel assembly 500 to collapse the system 100.

Referring back to FIG. 12, a latching device 850 (e.g., a D-ring, hook, snap, etc.) may be provided on each side panel 200, 300 and the vehicle to latch the system 100 in a collapsed or folded position. This may be useful if the operator chooses to have the system 100 in a collapsed or folded position while driving the vehicle. In addition, the latching device 850 secures the system 100 in a collapsed position to thereby permit the opening of the doors.

Figure 20:
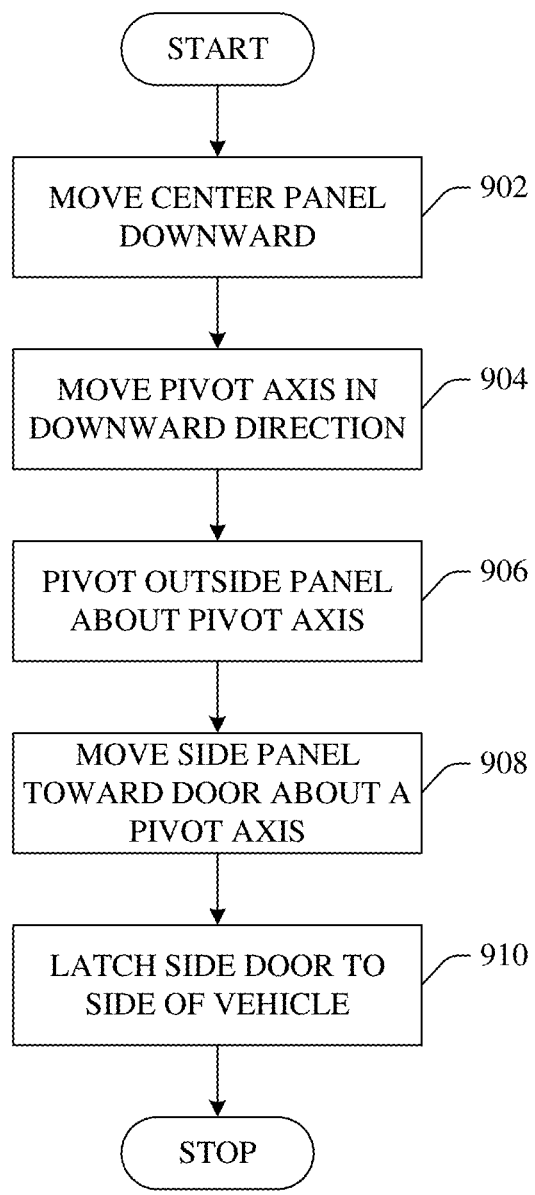
FIG. 20 is a block diagram illustrating a method of collapsing the innovative aerodynamic resistance reduction device in accordance with the innovation.
Figure 21:
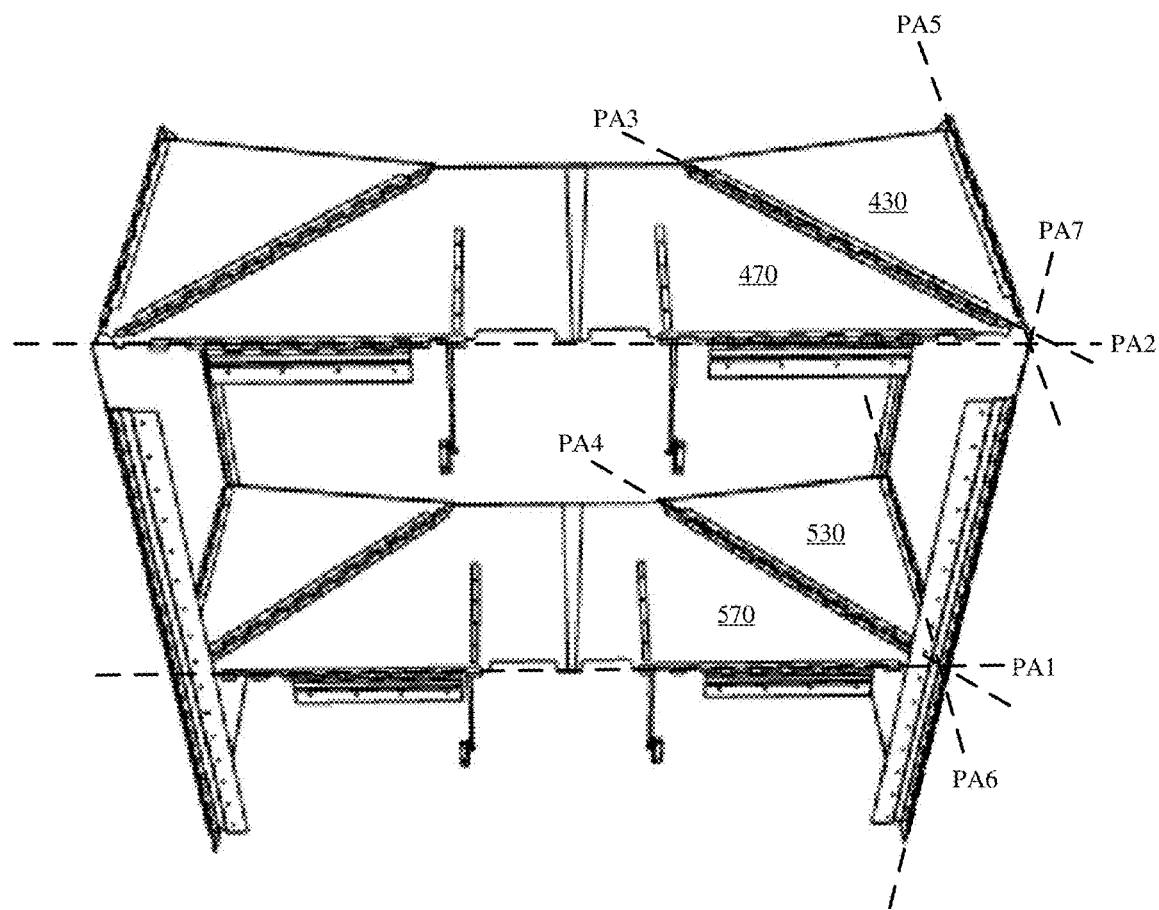
FIG. 21 is a perspective view from a top proximal side of the innovative aerodynamic resistance reduction device in accordance with the innovation.
Figure 23:
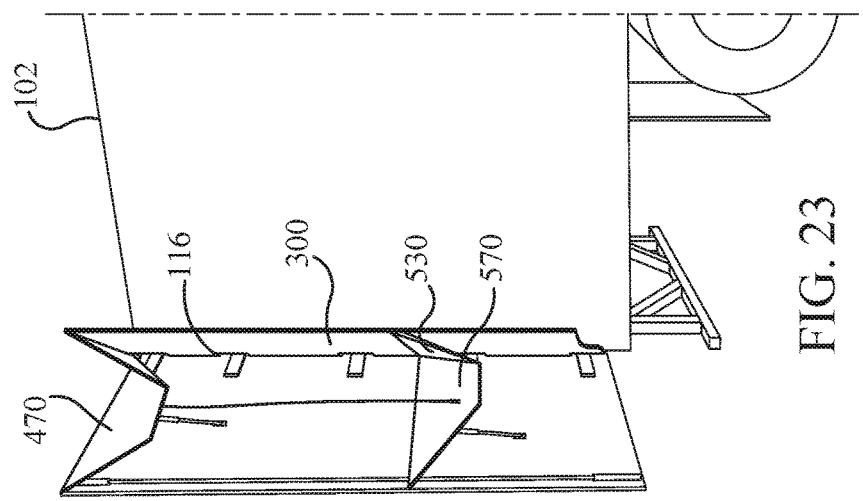
Figure 22:
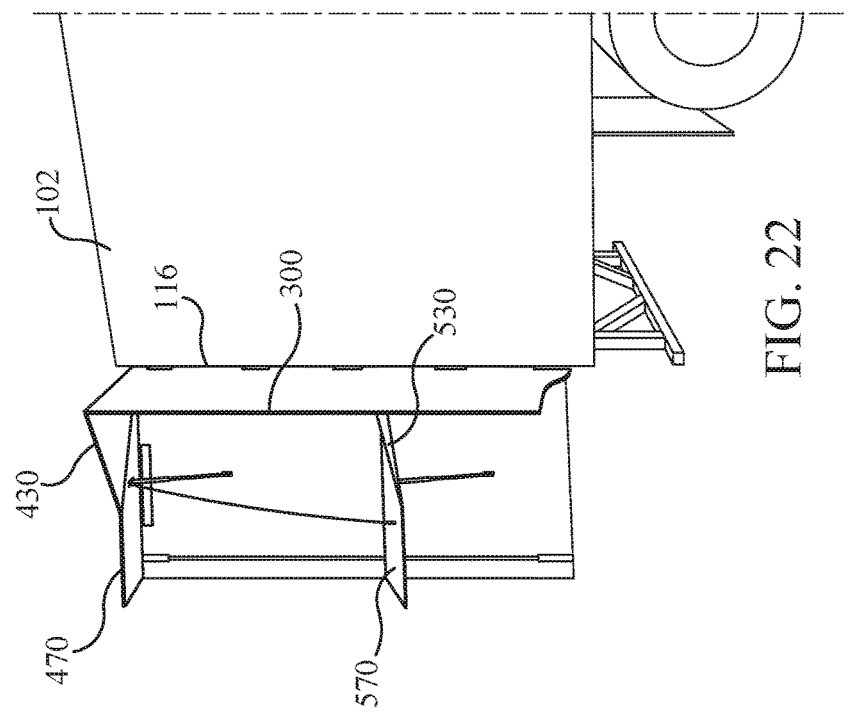

Referring to FIGS. 20 and 21 and the sequence illustrated in FIGS. 22-25, collapsing or folding the system 100 when the vehicle is not in motion will now be described. The collapsing of the system 100 will be described with reference to the panels on the curbside portion of the system 100. Collapsing of the panels on the roadside portion is the same as the curbside portion and, thus, will not be repeated. At 902, the operator moves the first (curbside) center panel 570 of the second horizontal panel assembly 500 in a downward direction. Thus, the center panel begins to pivot about a first pivot axis PA1 toward the first door 108. This in turn moves the first (curbside) center panel 470 in a downward direction, which begins to pivot about a second pivot axis PA2, toward the first door 108. Simultaneously, at 904, a third and fourth pivot axis PA3, PA4 defined between the first outside panels 430, 530 and the first center panels 470, 570 respectively, move in a downward direction. Simultaneously, at 906, the first outside panel 430 pivots about a fifth pivot axis PA5 defined between the first end 202 of the first side panel 200 and the first outside panel 430 of the first horizontal panel assembly 400, and the first outside panel 530 pivots about a sixth pivot axis PA6 between the first attachment hinge 590 and the first outside panel 530 of the second horizontal panel assembly 500. Simultaneously, at 908, the second side panel 300 pivotally moves toward the second door 108 about a seventh pivot axis PA7 defined between the second side 306 of the second side panel 300 and the side panel mounting hinge 616. At 910, once the system 100 is in a collapsed or folded position against the doors 106, 108, the operator can use the latching device 850 to latch each side (roadside and curbside) of the doors 106, 108 to the vehicle. Once attached, the operator can easily open the doors 106, 108 without interference from the system 100.

As the operator begins to swing one of the doors 106, 108 to its closed position, the compressible actuators 700 extend and the panels begin to pivot about the pivot axis described above reverse of the above description and return to their deployed aerodynamics mode.

In an example embodiment, the compressible actuator 706 may be automated to perform the folding and unfolding of the system 100. In another embodiment, a sensor or sensors may be used to unfold the system 100 when the vehicle reaches a predetermined speed and fold the system 100 when the vehicle either stops or is traveling less than the predetermined speed.

Figure 26:
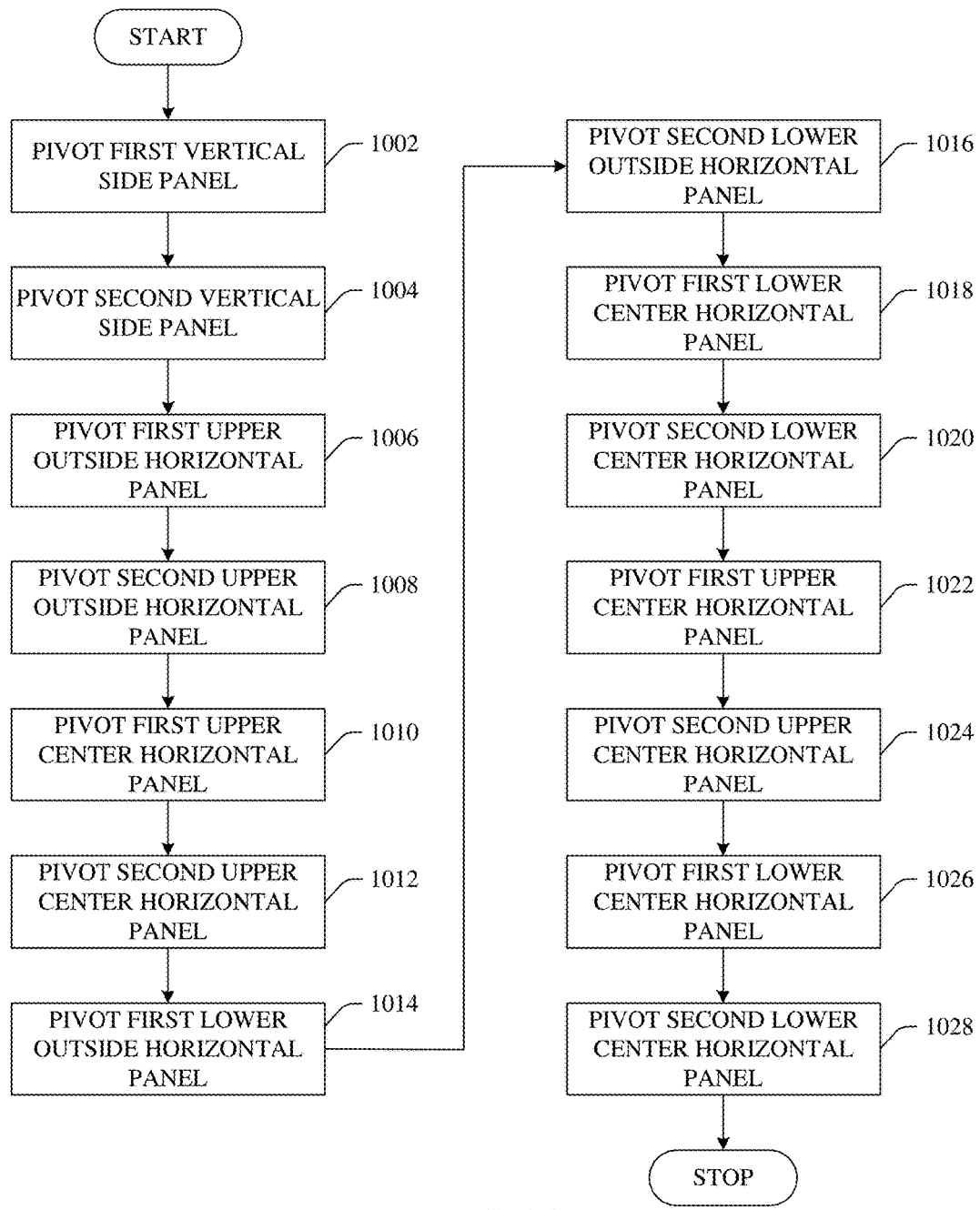
FIG. 26 is a block diagram illustrating a method of reducing aerodynamic resistance on a vehicle using the innovative aerodynamic resistance reduction device in accordance with the innovation.

Referring to FIG. 26, a method of reducing aerodynamic resistance on a vehicle, which includes pivoting the multiple panels described herein, will now be described. At 1002, pivoting the first vertical side panel 200 about an axis such that the first vertical side panel 200 extends vertically outward from the rear end 104 of the vehicle 102, At 1004, pivoting the second vertical side panel 300 about an axis such that the second vertical side panel 300 extends vertically outward from the rear end 104 of the vehicle 102. At 1006, pivoting the first upper outside horizontal panel 410 about an axis defined between the top end 210 of the first vertical side panel 200 and the outside edge 412 of the first upper outside horizontal panel 410 such that the first upper outside horizontal panel 410 extends horizontally outward from the rear end 104 of the vehicle 102. At 1008, pivoting the second upper outside horizontal panel 430 about an axis defined between the top end 310 of the second vertical side panel 300 and the outside edge 432 of the second upper outside horizontal panel 430 such that the second upper outside horizontal panel 430 extends horizontally outward from a rear end 104 of the vehicle 102. At 1010, pivoting the first upper center horizontal panel 450 about an axis defined between an angled edge 418 on the first upper outside horizontal panel 410 and the angled edge 454 on the first upper center horizontal panel 450 such that the first upper center horizontal panel 450 extends horizontally outward from the rear end 104 of the vehicle 104. At 1012, pivoting the second upper center horizontal panel 470 about an axis defined between the angled edge 438 on the second upper outside horizontal panel 430 and the angled edge 474 on the second upper center horizontal panel 470 such that the second upper center horizontal panel 470 extends horizontally outward from the rear end 104 of the vehicle 102.

Still referring to FIG. 26, the method further includes, at 1014, pivoting the first lower outside horizontal panel 510 about an axis defined adjacent to the inside surface of and between the top end 210 and the lower end 204 of the first vertical side panel 200 such that the first lower outside horizontal panel 510 extends horizontally outward from the rear end 104 of the vehicle 102. At 1016, pivoting the second lower outside horizontal panel 530 about an axis defined adjacent to the inside surface of and between the top end 310 and the lower end 304 of the second vertical side panel 300 such that the second lower outside horizontal panel 530 extends horizontally outward from the rear end 104 of the vehicle 102. At 1018, pivoting the first lower center horizontal panel 550 about an axis defined between the angled edge 518 on the first lower outside horizontal panel 510 and an angled edge 554 on the first lower center horizontal panel 550 such that the first lower center horizontal panel 550 extends horizontally outward from a rear end 104 of the vehicle 102. At 1020, pivoting the second lower center horizontal panel 570 about an axis defined between the angled edge 538 on the second lower outside horizontal panel 530 and the angled edge 574 on the second lower center horizontal panel 570 such that the second lower center horizontal panel 570 extends horizontally outward from the rear end 104 of the vehicle 102.

Still referring to FIG. 26, the method further includes, at 1022, pivoting the first upper center horizontal panel 450 about an axis defined between the rear end 104 of the vehicle 102 and the first upper center horizontal panel 450. At 1024, pivoting the second upper center horizontal panel 470 about an axis defined between the rear end 104 of the vehicle 102 and the second upper center horizontal panel 470. At 1026, pivoting the first lower center horizontal panel 550 about an axis defined between the rear end 104 of the vehicle 102 and the first lower center horizontal panel 550. At 1028, pivoting the second lower center horizontal panel 570 about an axis defined between the rear end 104 of the vehicle 102 and the second lower center horizontal panel 570.

Figure 27:
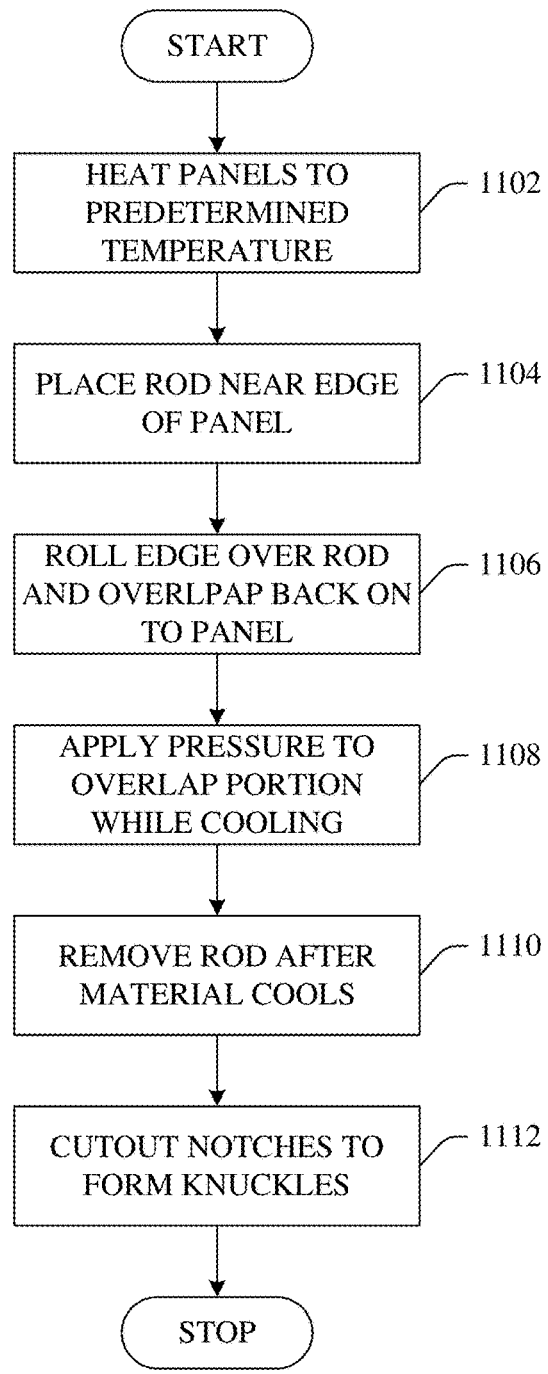
FIG. 27 is block diagram illustrating a method of forming an integrated hinge of the innovative aerodynamic resistance reduction device in accordance with the innovation.

Referring to FIG. 27, the integrated hinges are formed using a heat treating method, as will now be described. At 1102, the panels are heated to a predetermined temperature. At 1104, a rod is placed near the corresponding edge of the panel. At 1106, the edge is rolled over the rod such that the edge overlaps back onto the panel. At 1108, pressure is applied to the overlapped portion while the material cools. At 1110, after the material has cooled the rod is removed (slid) out from the rolled edge, thus, forming a circular cross section along the edge of the panel. At 1112, notches are cutout, using for example, a water jet system, at equal intervals along the rolled edge thereby leaving equally spaced knuckles along the rolled edge and, thus, forming the integrated hinge described above.

The integrated hinges described herein have an improved durability and transfer loads evenly over a longer distance than traditional external-removable hinges. In addition, the rolled configuration of the integrated hinges reduces the risk of the panels catching on an object during the folding and unfolding of the system 100.

In an alternative embodiment, in order to maximize aerodynamic resistance reduction and increase fuel efficiency, the first horizontal panel assembly 400 can be located at the very top of the rear end of the vehicle adjacent to the top of the vehicle. In this embodiment, however, the first horizontal panel assembly 400 would cover the required lights at the top of vehicle. In order to overcome this issue, the lights can be relocated to mount on the system 100. Special lights could be used that shine the light in two directions that would make them visible when the system 100 is both in an open and closed position.

Alternatively, two sets of lights could be installed on the system 100 each with a single light orientation for the open and shut position using, for example, a power induction system including a power transmitter mounted on the vehicle (e.g., trailer) and a receiver on the door or system 100.

Alternatively, the lights can be relocated to the top of the trailer frame and housed in a curved airfoil shape extending across the top of the trailer. In another embodiment, the normal trailer lights could be replaced with very slim lights mounted right adjacent the top of the trailer so that they are not exposed to damage but enable the system 100 to be mounted just beneath.

In an alternate embodiment, an installation system may be provided to facilitate the installation of the system 100 described above. The installation system may include a template and a template hanger that holds the template in place. The template hanger may be in the form of a bracket, clamp, etc. to secure the template to the rear end 104 of the vehicle 102. In one embodiment, the template hanger may be an L-shaped bracket. The L-shaped bracket may include a first plate and a second plate that is approximately 90 degrees from the first plate. The first plate is clamped to a top surface of the vehicle 102 and the second plate hangs down over the top horizontal edge 118 of the vehicle along the first or second swinging door 106, 108. The second plate may include multiple apertures that facilitate holding the template in place.

The template may be made from a composite material and includes multiple attachment devices that engage the multiple apertures in the second plate to hold the template in place. The multiple apertures in the second plate allow the template to be placed in various positions along the rear door to compensate for different vehicle configurations and/or objects (e.g., lock rods, locks, handles, hinges) on the rear end 104 of the vehicle 102. The template further includes multiple apertures (drill holes) that designate the location of mounting fasteners that fasten the mounting hinges 600 to the first and second swinging doors 106, 108.

Figure 28:
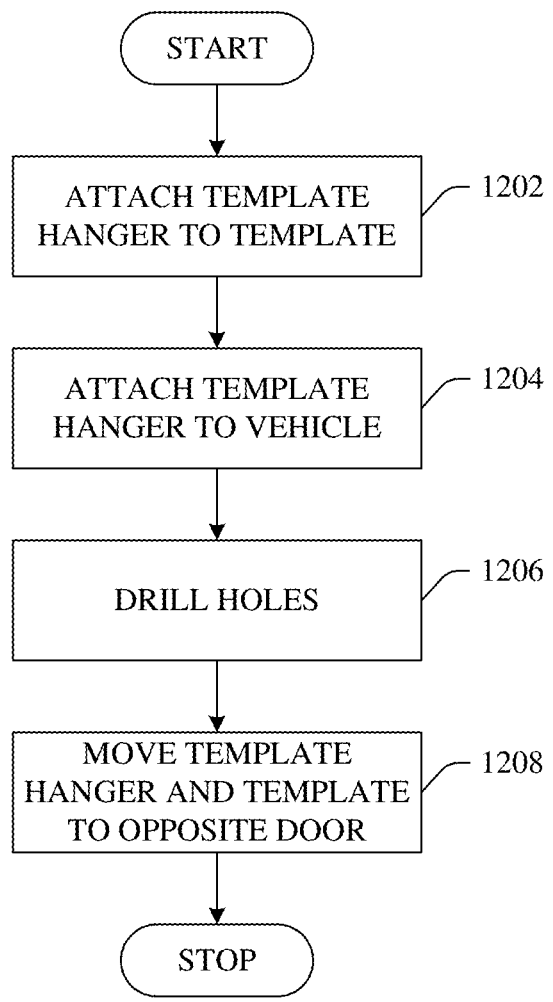
FIG. 28 is block diagram illustrating a method using an installation template to prepare the vehicle for installation of the innovative aerodynamic resistance reduction device in accordance with the innovation.

Referring to FIG. 28, to prepare the vehicle for the installation of the system 100, at 1202, the template hanger is attached to a top end portion of the template. At 1204, the template hanger is attached to the rear end 104 of the vehicle 102 above one of the doors (for example, the first rear door 106), such that the drill holes defined in the template are appropriately located on the first rear door. At 1206, multiple holes are drilled in the first door 106 using the drill holes as a guide. At 1208, the template and template hanger are moved to the opposite door, in this example the second door 108, and the method beginning at 1204 is repeated.

It is to be appreciated that in other embodiments, the template hanger can be attached to the vehicle first and the template can then be attached to the template hanger. Still in other embodiments, the process of drilling the holes can be an automated process where an automated drilling device can be attached to the rear end 104 of the vehicle 102 in retrofit application.

Still further, in other embodiments, the drilling process can be performed during the manufacturing stage of the doors 106, 108. During the manufacturing process, the holes for attachment of the system 100 can be drilled at the same time as the holes for other objects (e.g., hinges, locks, handles, etc.) attached to the doors. The process of drilling the holes can be performed with an automated computer controlled system.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An aerodynamic resistance reduction system, comprising:
   a pair of vertical panels pivotally attached to a rear end adjacent to rear vertical edges of a vehicle;
   a first horizontal panel assembly pivotally attached at a top end to each of the pair of vertical panels and pivotally attached to the rear end adjacent to a top horizontal edge of the vehicle, the first horizontal panel assembly having separate overlapping panels, the first horizontal panel assembly comprises a plurality of panels that pivot with respect to each other to facilitate the folding and unfolding of the system; and
   a second horizontal panel assembly pivotally attached adjacent to an inside surface of each of the pair of side panels, the second horizontal panel assembly being disposed between the first horizontal panel assembly and a lower edge of the rear end of the vehicle,
   wherein edges of each panel are formed into integrated hinges that facilitate pivoting the pair of vertical panels, the first horizontal panel assembly, and the second horizontal panel assembly, and
   wherein the first horizontal panel assembly and the second horizontal panel assembly pivot in a downward direction so as not to conflict with a handle or a latch on the rear end of the vehicle, wherein each of the integrated hinges comprises a first plurality of knuckles formed in an edge roll of a first panel that mates with a second plurality of knuckles formed in an edge roll of a second panel and wherein a hinge pin establishes a pivot point between the first and second plurality of knuckles.

2. The system of claim 1, further comprising a plurality of mounting hinges that mate with the integrated hinges on corresponding panels, wherein the plurality of mounting hinges include a plurality of knuckles formed in an edge roll of each of the plurality of mounting hinges.

3. The system of claim 2, further comprising a plurality of compressible actuators attached to an underside of the first and/or second horizontal panel assembly and to the rear end of the vehicle that compress when the system is folded and expand when the system is unfolded.

4. The system of claim 3, further comprising a catch mechanism disposed on a distal edge on one half of both the first and second horizontal panel assemblies and being configured to receive an opposite half of both the first and second horizontal panel assemblies.

5. The system of claim 1 further comprising an integral stiffener disposed along a distal edge of each of the pair of vertical panels that provides rigidity to minimize a bowing effect on each of the pair of side panels due to airflow during operation, wherein the integral stiffener is formed from the distal edge of each of the pair of vertical panels via a fold, roll or overlap.

6. The system of claim 1, wherein the pair of vertical side panels include an angled lower end that facilitates the folding of the pair of side panels against the rear end of the vehicle.

7. An aerodynamic resistance reduction system configured to attach to a rear end of a tractor trailer comprising:
  a first vertical panel pivotally attached to a first rear swinging door adjacent to one rear vertical corner of the tractor trailer;
  a second vertical panel pivotally attached to a second rear swinging door adjacent to an opposite rear vertical corner of the tractor trailer; and
  a first horizontal panel assembly, wherein an edge of the first vertical panel is rolled and formed into a first hinge having a plurality of cutouts and a first edge of the first horizontal panel assembly is rolled and formed into a second hinge having a plurality of cutouts, the first horizontal panel assembly is pivotally attached to a top end of the first vertical panel via an integrated hinge formed by mating a subset of the cutouts of the first hinge and the second hinge, and an edge of the second vertical panel is formed into a third hinge having a plurality of cutouts and a second edge of the first horizontal panel assembly is formed into a fourth hinge having a plurality of cutouts, the first horizontal panel assembly is pivotally attached to a top end of the second vertical panel via an integrated hinge formed by mating a subset of the cutouts of the third hinge and the fourth hinge, and the first horizontal panel assembly is pivotally attached to the first rear swinging door and the second rear swinging door;
  wherein the first horizontal panel assembly includes a plurality of panels that pivot via integrated hinges with respect to each other to facilitate the folding and unfolding of the system.

8. The system of claim 7, further comprising a second horizontal panel assembly pivotally attached to an inside surface of the first vertical panel via an integrated hinge and an inside surface of the second vertical panel via an integrated hinge, the second horizontal panel assembly being vertically disposed between the first horizontal panel assembly and a lower edge of the rear end of the tractor trailer, wherein the second horizontal panel pivots downward so as to enable access to a door mechanism at the rear end of the tractor trailer.

9. The system of claim 8, wherein the first horizontal panel assembly includes a first upper outside panel pivotally attached to the first vertical panel via an integrated hinge, a second upper outside panel pivotally attached to the second vertical panel via an integrated hinge, a first upper center panel pivotally attached to the first upper outside panel and the first rear swinging door, and a second upper center panel pivotally attached to the second upper outside panel and the second rear swinging door.

10. The system of claim 9, wherein the second horizontal panel assembly includes a first lower outside panel pivotally attached to the first vertical panel via an integrated hinge, a second lower outside panel pivotally attached to the second vertical panel via an integrated hinge, a first lower center panel pivotally attached to the first lower outside panel and the first rear swinging door, and a second lower center panel pivotally attached to the second lower outside panel and the second rear swinging door.

11. The system of claim 8, wherein the first vertical panel, the second vertical panel, the first horizontal panel assembly, and the second horizontal panel assembly include integrated hinges that facilitate pivoting of the pair of vertical panels, the first horizontal panel assembly, and the second horizontal panel assembly, and wherein each of the integrated hinges comprises a plurality of knuckles cut from a rolled edge that mate and connect via a pin.

12. The system of claim 8, further comprising release cords that facilitate the collapsing or folding of the system when the tractor trailer is not in motion.

13. The system of claim 12, wherein the release cords have a first end attached to an underside of the first horizontal panel assembly and a second end attached to a top of the second horizontal panel assembly.

14. A method reducing aerodynamic resistance on a vehicle comprising:
  pivoting a first vertical side panel about an axis such that the first vertical side panel extends vertically outward from a rear end of the vehicle;
  pivoting a second vertical side panel about an axis such that the second vertical side panel extends vertically outward from a rear end of the vehicle;
  pivoting a first upper outside horizontal panel about an axis defined via an integrated pinned hinge, having a plurality of knuckles disposed in a rolled edge, between a top end of the first vertical side panel and an outside edge of the first upper outside horizontal panel such that the first upper outside horizontal panel extends horizontally outward from a rear end of the vehicle, wherein an edge of the first vertical side panel is rolled, cut and formed into a first hinge and an edge of the first upper outside horizontal panel is rolled, cut and formed into a second hinge, the integrated pinned hinge comprises a mating between the first hinge and the second hinge;
  pivoting a second upper outside horizontal panel about an axis defined via an integrated pinned hinge, having a plurality of knuckles disposed in a rolled edge, between a top end of the second vertical side panel and an outside edge of the second upper outside horizontal panel such that the second upper outside horizontal panel extends horizontally outward from the rear end of the vehicle, wherein an edge of the second vertical side panel is rolled, cut and formed into a third hinge and an edge of the second upper outside horizontal panel is rolled, cut and formed into a fourth hinge, the integrated pinned hinge comprises a mating between the third hinge and the fourth hinge;

pivoting a first upper center horizontal panel about an axis defined via an integrated pinned hinge, having a plurality of knuckles disposed in a rolled edge, between an angled edge on the first upper outside horizontal panel and an angled edge on the first upper center horizontal panel such that the first upper center horizontal panel extends horizontally outward from the rear end of the vehicle, wherein another edge of the first upper outside horizontal side panel is rolled, cut and formed into a fifth hinge and an edge of the first upper center horizontal panel is rolled, cut and formed into a sixth hinge, the integrated pinned hinge comprises a mating between the fifth hinge and the sixth hinge; and pivoting a second upper center horizontal panel about an axis defined via an integrated pinned hinge, having a plurality of knuckles disposed in a rolled edge, between an angled edge on the second upper outside horizontal panel and an angled edge on the second upper center horizontal panel such that the second upper center horizontal panel extends horizontally outward from the rear end of the vehicle, wherein another edge of the second upper outside horizontal side panel is rolled, cut and formed into a seventh hinge and an edge of the second upper center horizontal panel is rolled, cut and formed into an eighth hinge, the integrated pinned hinge comprises a mating between the seventh hinge and the eighth hinge.

15. The method of claim 14, further comprising:

pivoting a first lower outside horizontal panel about an axis defined via an integrated hinge adjacent to an inside surface of and between a top end and a lower end of the first vertical side panel such that the first lower outside horizontal panel extends horizontally outward from the rear end of the vehicle;

pivoting a second lower outside horizontal panel about an axis defined via an integrated hinge adjacent to an inside surface of and between a top end and a lower end of the second vertical side panel such that the second lower outside horizontal panel extends horizontally outward from the rear end of the vehicle;

pivoting a first lower center horizontal panel about an axis defined via an integrated hinge between an angled edge on the first lower outside horizontal panel and an angled edge on the first lower center horizontal panel such that the first lower center horizontal panel extends horizontally outward from the rear end of the vehicle; and pivoting a second lower center horizontal panel about an axis defined via an integrated hinge between an angled edge on the second lower outside horizontal panel and an angled edge on the second lower center horizontal panel such that the second lower center horizontal panel extends horizontally outward from the rear end of the vehicle.

16. The method of claim 15, further comprising:

pivoting the first upper center horizontal panel about an axis defined between the rear end of the vehicle and the first upper center horizontal panel; and pivoting the second upper center horizontal panel about an axis defined between the rear end of the vehicle and the second upper center horizontal panel.

17. The method of claim 16, further comprising:

pivoting the first lower center horizontal panel about an axis defined between the rear end of the vehicle and the first lower center horizontal panel; and pivoting the second lower center horizontal panel about an axis defined between the rear end of the vehicle and the second lower center horizontal panel.

18. The method of claim 17, wherein the plurality of panels include integrated hinges having a plurality of mated knuckles that facilitate the pivoting between the plurality of axes.

19. The method of claim 17, wherein the first lower center horizontal panel and the second lower center horizontal panel pivot in a downward direction not obstructing access to a door latch mechanism on a rear end of the vehicle.

* * * * *